(12) United States Patent
Thomas et al.

(10) Patent No.: US 12,309,200 B2
(45) Date of Patent: *May 20, 2025

(54) DETECTING PHISHING ATTACKS

(71) Applicant: Sophos Limited, Abingdon (GB)

(72) Inventors: Andrew J. Thomas, Oxfordshire (GB); Karl Ackerman, Topsfield, MA (US); James Douglas Bean, Portland, OR (US); Kenneth D. Ray, Seattle, WA (US); Daniel Stutz, Karlsruhe (DE)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,434

(22) Filed: Mar. 2, 2023

(65) Prior Publication Data

US 2023/0208879 A1    Jun. 29, 2023

Related U.S. Application Data

(63) Continuation of application No. 16/224,352, filed on Dec. 18, 2018, now Pat. No. 11,616,811, which is a
(Continued)

(51) Int. Cl.
*G06F 21/00* (2013.01)
*G06F 11/00* (2006.01)
(Continued)

(52) U.S. Cl.
CPC .......... *H04L 63/1483* (2013.01); *G06F 11/00* (2013.01); *G06F 21/40* (2013.01);
(Continued)

(58) Field of Classification Search
CPC ............ H04L 63/1483; H04L 41/0631; H04L 41/142; H04L 43/10; H04L 51/212;
(Continued)

(56) References Cited

U.S. PATENT DOCUMENTS 6,463,474 B1    10/2002    Fuh et al.
7,307,996 B2    12/2007    Forbes et al.
(Continued)

FOREIGN PATENT DOCUMENTS

WO    WO2018004600    1/2018

OTHER PUBLICATIONS

"U.S. Appl. No. 16/224,398 Final Office Action mailed Dec. 6, 2023", 29 pages.
(Continued)

*Primary Examiner* — Michael M Lee
(74) *Attorney, Agent, or Firm* — Strategic Patents, P.C.

(57) ABSTRACT

Disclosed herein is a technique for detecting potential phishing attacks by monitoring outbound web traffic from an endpoint, along with inbound electronic mail traffic addressed to a user of the endpoint. With this information, a search can be performed for possible sources in the web traffic of a request for a hyperlink located in the inbound mail traffic, and when no source is located, phishing remediation can be performed, including restrictions on access to the hyperlink at an endpoint operated by the user.

20 Claims, 16 Drawing Sheets

Related U.S. Application Data continuation of application No. PCT/US2016/040397, filed on Jun. 30, 2016.

(51) Int. Cl.

| | | |
|---|---|---|
| *G06F 21/40* | (2013.01) | |
| *G06F 21/43* | (2013.01) | |
| *G06F 21/44* | (2013.01) | |
| *G06F 21/45* | (2013.01) | |
| *G06F 21/55* | (2013.01) | |
| *G06F 21/56* | (2013.01) | |
| *G06F 21/57* | (2013.01) | |
| *G06F 21/64* | (2013.01) | |
| *H04L 9/32* | (2006.01) | |
| *H04L 9/40* | (2022.01) | |
| *H04L 41/0631* | (2022.01) | |
| *H04L 41/142* | (2022.01) | |
| *H04L 43/10* | (2022.01) | |
| *H04L 51/212* | (2022.01) | |
| *H04L 67/104* | (2022.01) | |

(52) U.S. Cl.
CPC .............. *G06F 21/43* (2013.01); *G06F 21/44* (2013.01); *G06F 21/45* (2013.01); *G06F 21/554* (2013.01); *G06F 21/566* (2013.01); *G06F 21/57* (2013.01); *G06F 21/64* (2013.01); *H04L 9/3213* (2013.01); *H04L 41/0631* (2013.01); *H04L 41/142* (2013.01); *H04L 43/10* (2013.01); *H04L 51/212* (2022.05); *H04L 63/02* (2013.01); *H04L 63/0209* (2013.01); *H04L 63/0227* (2013.01); *H04L 63/0236* (2013.01); *H04L 63/0254* (2013.01); *H04L 63/0428* (2013.01); *H04L 63/08* (2013.01); *H04L 63/0807* (2013.01); *H04L 63/10* (2013.01); *H04L 63/14* (2013.01); *H04L 63/1408* (2013.01); *H04L 63/1416* (2013.01); *H04L 63/1425* (2013.01); *H04L 63/1441* (2013.01); *H04L 63/1466* (2013.01); *H04L 63/1491* (2013.01); *H04L 63/164* (2013.01); *H04L 63/20* (2013.01); *H04L 67/104* (2013.01)

(58) Field of Classification Search
CPC ........ G06F 21/44; G06F 21/45; G06F 21/554; G06F 21/566; G06F 21/57; G06F 21/64
See application file for complete search history.

(56) References Cited

U.S. PATENT DOCUMENTS

| | | | |
|---|---|---|---|
| 7,516,488 B1 * | 4/2009 | Kienzle | ................ H04L 51/212 726/22 |
| 8,181,244 B2 | 5/2012 | Boney | |
| 8,418,250 B2 | 4/2013 | Morris et al. | |
| 8,726,389 B2 | 5/2014 | Morris et al. | |
| 8,763,123 B2 | 6/2014 | Morris et al. | |
| 8,850,567 B1 | 9/2014 | Hsieh et al. | |
| 8,856,505 B2 | 10/2014 | Schneider | |
| 8,990,891 B1 | 3/2015 | Chickering et al. | |
| 9,137,209 B1 | 9/2015 | Brandwine et al. | |
| 9,413,721 B2 | 8/2016 | Morris et al. | |
| 9,578,045 B2 | 2/2017 | Jaroch et al. | |
| 9,680,860 B1 | 6/2017 | Wallace et al. | |
| 10,051,001 B1 * | 8/2018 | Ashley | ................. H04L 63/083 |
| 10,091,235 B1 | 10/2018 | Kushwaha et al. | |
| 10,257,224 B2 | 4/2019 | Jaroch et al. | |
| 10,601,865 B1 | 3/2020 | Mesdaq et al. | |
| 2003/0158921 A1 | 8/2003 | Hare et al. | |
| 2006/0062141 A1 | 3/2006 | Oran et al. | |
| 2006/0140181 A1 | 6/2006 | Eldar et al. | |
| 2007/0079379 A1 | 4/2007 | Sprosts et al. | |
| 2007/0094325 A1 | 4/2007 | Ih et al. | |
| 2007/0192855 A1 | 8/2007 | Hulten et al. | |
| 2007/0199054 A1 | 8/2007 | Florencio et al. | |
| 2008/0082662 A1 | 4/2008 | Dandliker et al. | |
| 2008/0282335 A1 | 11/2008 | Abzarian et al. | |
| 2009/0089859 A1 | 4/2009 | Cook et al. | |
| 2010/0293610 A1 | 11/2010 | Beachem et al. | |
| 2010/0306845 A1 | 12/2010 | Vaithilingam et al. | |
| 2010/0332664 A1 | 12/2010 | Yevmenkin et al. | |
| 2011/0314546 A1 | 12/2011 | Aziz et al. | |
| 2012/0240185 A1 | 9/2012 | Kapoor et al. | |
| 2012/0240224 A1 | 9/2012 | Payne et al. | |
| 2014/0129920 A1 | 5/2014 | Sheretov et al. | |
| 2015/0312268 A1 | 10/2015 | Ray et al. | |
| 2016/0308762 A1 | 10/2016 | Teng et al. | |
| 2017/0046506 A1 | 2/2017 | Fujii et al. | |
| 2017/0206351 A1 | 7/2017 | Jay et al. | |
| 2017/0237753 A1 | 8/2017 | Manning Dawson | |
| 2017/0302535 A1 | 10/2017 | Lee | |
| 2017/0310703 A1 | 10/2017 | Ackerman et al. | |
| 2018/0332079 A1 | 11/2018 | Ashley et al. | |
| 2019/0149574 A1 | 5/2019 | Thomas et al. | |
| 2019/0312839 A1 | 10/2019 | Grimm et al. | |
| 2024/0214420 A1 | 6/2024 | Thomas et al. | |

OTHER PUBLICATIONS

"U.S. Appl. No. 15/945,346 Non-Final Office Action mailed Feb. 24, 2020", 18 pages.
"U.S. Appl. No. 15/945,346 Notice of Allowance mailed Nov. 25, 2020", 11 pages.
"U.S. Appl. No. 16/224,352 Final Office Action mailed Mar. 18, 2022", 24 pages.
"U.S. Appl. No. 16/224,352 Final Office Action mailed Apr. 9, 2021", 23 pages.
"U.S. Appl. No. 16/224,352 Non-Final Office Action mailed Oct. 5, 2021", 23 pages.
"U.S. Appl. No. 16/224,352 Non-Final Office Action mailed Dec. 1, 2020", 25 pages.
"U.S. Appl. No. 16/224,352 Notice of Allowance mailed Oct. 13, 2022", 13 pages.
"U.S. Appl. No. 16/224,352 Notice of Allowance mailed Dec. 9, 2022", 13 pages.
WIPO, "Application No. PCT/US19/25710 International Preliminary Report on Patentability mailed Oct. 15, 2020", 16 pages.
"U.S. Appl. No. 15/945,346 Notice of Allowance mailed Aug. 12, 2020", 13 pages.
WIPO, "PCT Application No. PCT/US16/40397 International Preliminary Report on Patentability mailed Jan. 11, 2019", 9 pages.
ISA, "PCT Application No. PCT/US16/40397 International Search Report and Written Opinion mailed Nov. 7, 2016", 13 pages.
ISA, "PCT Application No. PCT/US19/25710 International Search Report and Written Opinion mailed Aug. 6, 2019", 19 pages.
"U.S. Appl. No. 18/364,902 Non-Final Office Action mailed Apr. 25, 2024", 14 pages.
"U.S. Appl. No. 16/224,398 Notice of Allowance mailed Dec. 5, 2024", 10 pages.

* cited by examiner

DETECTING PHISHING ATTACKS

CROSS-REFERENCE TO RELATED APPLICATIONS

This application is a continuation of U.S. patent application Ser. No. 16/224,352 filed on Dec. 18, 2018, which is a continuation filed under 35 U.S.C. § 111(a) that claims priority under 35 U.S.C. § 120 and § 365(c) to International App. No. PCT/US16/40397 filed on Jun. 30, 2016. This application is also related to U.S. patent application Ser. No. 16/224,398 filed on Dec. 18, 2018, the entire contents of which are hereby incorporated herein by reference.

TECHNICAL FIELD

This application relates to improved protection of endpoints in an enterprise network against malicious attacks or other misuse.

BACKGROUND

Enterprise networks may contain valuable corporate and personal information that forms an increasingly attractive target for malicious actors. Useful techniques for securing endpoints in a network against malicious activity are described by way of example in commonly-owned U.S. patent application Ser. No. 15/099,524 filed on Apr. 14, 2016, U.S. patent application Ser. No. 15/130,244 filed on Apr. 15, 2016 and U.S. patent application Ser. No. 15/136,687 filed on Apr. 22, 2016, each of which is hereby incorporated by reference in its entirety.

There remains a need for improved techniques for detecting and protecting against malicious activity and consequences thereof.

SUMMARY

Disclosed herein is a technique for detecting potential phishing attacks by monitoring outbound web traffic from an endpoint, along with inbound electronic mail traffic addressed to a user of the endpoint. With this information, a search can be performed for possible sources in the web traffic of a request for a hyperlink located in the inbound mail traffic, and when no source is located, phishing remediation can be performed, including restrictions on access to the hyperlink at an endpoint operated by the user.

In an aspect, a computer program product disclosed herein for preventing phishing attacks may include computer executable code embodied in a non-transitory computer readable medium that, when executing on one or more computing devices, causes the one or more computing devices to perform the steps of monitoring, with a local security agent executing on an endpoint, outbound web traffic originating from a web browser executing on the endpoint, wherein the endpoint is coupled in a communicating relationship with a threat management facility, the endpoint is associated with an enterprise network managed by the threat management facility, the endpoint further associated with a user of the enterprise network, and the local security agent is configured to communicate information about the outbound web traffic to the threat management facility, monitoring, with the threat management facility, inbound electronic mail traffic addressed to the user of the endpoint, in response to a hyperlink to an external resource detected in an electronic mail in the inbound electronic mail traffic addressed to the user, performing a search, at the threat management facility, of the outbound web traffic originating from the web browser for one or more possible sources of a request for the electronic mail by the user, and in response to the search failing to identify one or more possible source of the request for the electronic mail by the user in the outbound web traffic from the web browser, restricting, with the local security agent, access from the endpoint, via the hyperlink in the electronic mail, to the external resource.

Implementations may include one or more of the following features. The computer program product may further include code that causes the one or more computing devices to perform the step of, in response to the search identifying one or more possible sources of the request for the electronic mail by the user in the outbound web traffic, allowing access to the external resource from the endpoint via the hyperlink in the electronic mail. The outbound web traffic may include a user registration process associated with the electronic mail.

In another aspect, a method disclosed herein may include monitoring outbound web traffic originating from a web browser executing on an endpoint, monitoring inbound electronic mail traffic addressed to a user associated with the endpoint, in response to a hyperlink to an external resource detected in an electronic mail in the inbound electronic mail traffic addressed to the user, performing a search of the outbound web traffic originating from the web browser for one or more possible sources of a request for the electronic mail by the user, and in response to the search failing to identify one or more possible source of the request for the electronic mail by the user in the outbound web traffic from the web browser, restricting access from the endpoint, via the hyperlink in the electronic mail, to the external resource.

Implementations may include one or more of the following features. Monitoring outbound web traffic may include monitoring outbound web traffic with at least one of a local security agent executing on the endpoint and a threat management facility for an enterprise network. Monitoring inbound electronic mail traffic may include monitoring inbound electronic mail traffic with at least one of a local security agent executing on the endpoint and a threat management facility for an enterprise network. Restricting access to the external resource from the endpoint may include permitting access to the external resource according to a security policy of an enterprise network if the external resource has a known, good reputation. Performing the search may include searching an historical log of outbound web traffic stored at a threat management facility for an enterprise network, and wherein performing the search may include searching for a correspondence between a URL of the hyperlink and a second URL of a remote web site in the outbound web traffic. The monitoring inbound electronic mail traffic may include analyzing a displayed message within the inbound electronic mail traffic for text indicating that the electronic mail is responsive to a user registration process. Restricting access may include preventing submission of credentials for the user to the external resource. The monitoring inbound electronic mail traffic may include monitoring activity by a local electronic mail client executing on the endpoint. The monitoring inbound electronic mail traffic may include monitoring activity within a web mail client displayed within the web browser executing on the endpoint. Restricting access may include notifying the user of an unsolicited electronic mail and requesting an explicit authorization from the user before permitting use of the hyperlink to access the external resource. Monitoring outbound web traffic may include restricting the outbound web traffic according to a security policy for an enterprise network. The monitoring inbound electronic mail traffic may include restricting the inbound electronic mail traffic according to a security policy for an enterprise network. At least one of monitoring inbound electronic mail traffic and the monitoring outbound web traffic may include remotely monitoring network communications at a firewall coupled between the endpoint and a gateway for an enterprise network.

In another aspect, a system disclosed herein may include a network interface configured to couple in a communicating relationship with a network, a memory, and a processor. The processor may be configured by computer executable code stored in the memory to perform the steps of monitoring outbound web traffic originating from a web browser executing on an endpoint, the endpoint associated with an enterprise network, and the endpoint further associated with a user of the enterprise network, monitoring inbound electronic mail traffic addressed to the user of the endpoint, in response to a hyperlink to an external resource detected in an electronic mail in the inbound electronic mail traffic addressed to the user, performing a search of the outbound web traffic originating from the web browser for one or more possible sources of a request for the electronic mail by the user, and in response to the search failing to identify one or more possible source of the request for the electronic mail by the user in the outbound web traffic from the web browser, restricting access from the endpoint, via the hyperlink in the electronic mail, to the external resource.

Implementations may include one or more of the following features. The processor may be further configured to conditionally allow access to the external resource based on a security policy of the enterprise network. The device may include a threat management facility for the enterprise network. The device may include a firewall between the endpoint and the network.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
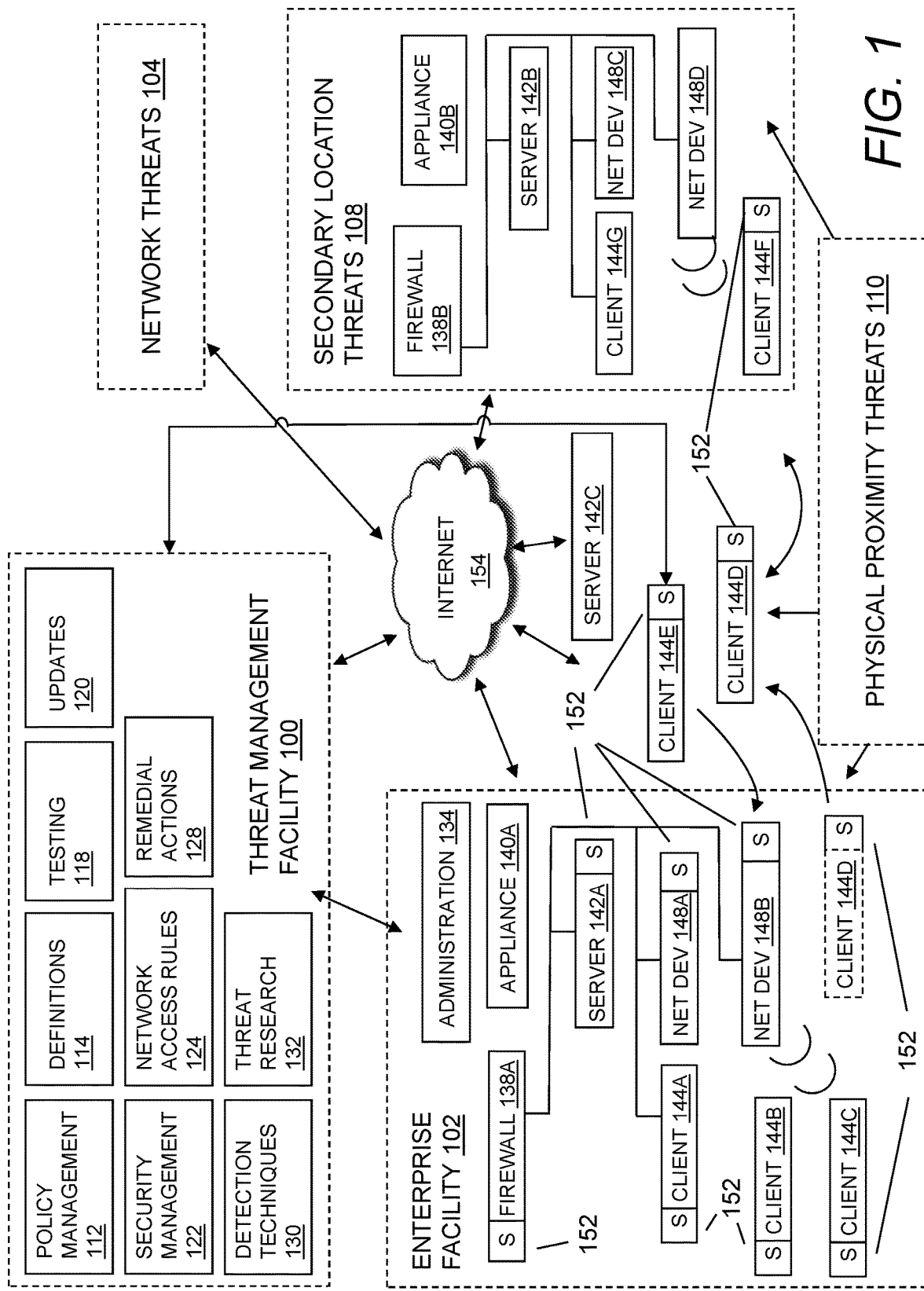
FIG. 1 illustrates an environment for threat management.

FIG. 1 illustrates an environment for threat management. Specifically, FIG. 1 depicts a block diagram of a threat management system providing protection to an enterprise against a plurality of threats-a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach. It should be understood that an enterprise model is applicable to organizations and users of any size or type. For example, an enterprise may be or may include a group or association of endpoints, networks, users, and the like within or outside of one or more protected locations. It should be understood that an enterprise may include one or more offices or business locations, or one or more homes, where each location, or portions of each location, or a collection of locations may be treated as a client facility.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VOIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VOIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
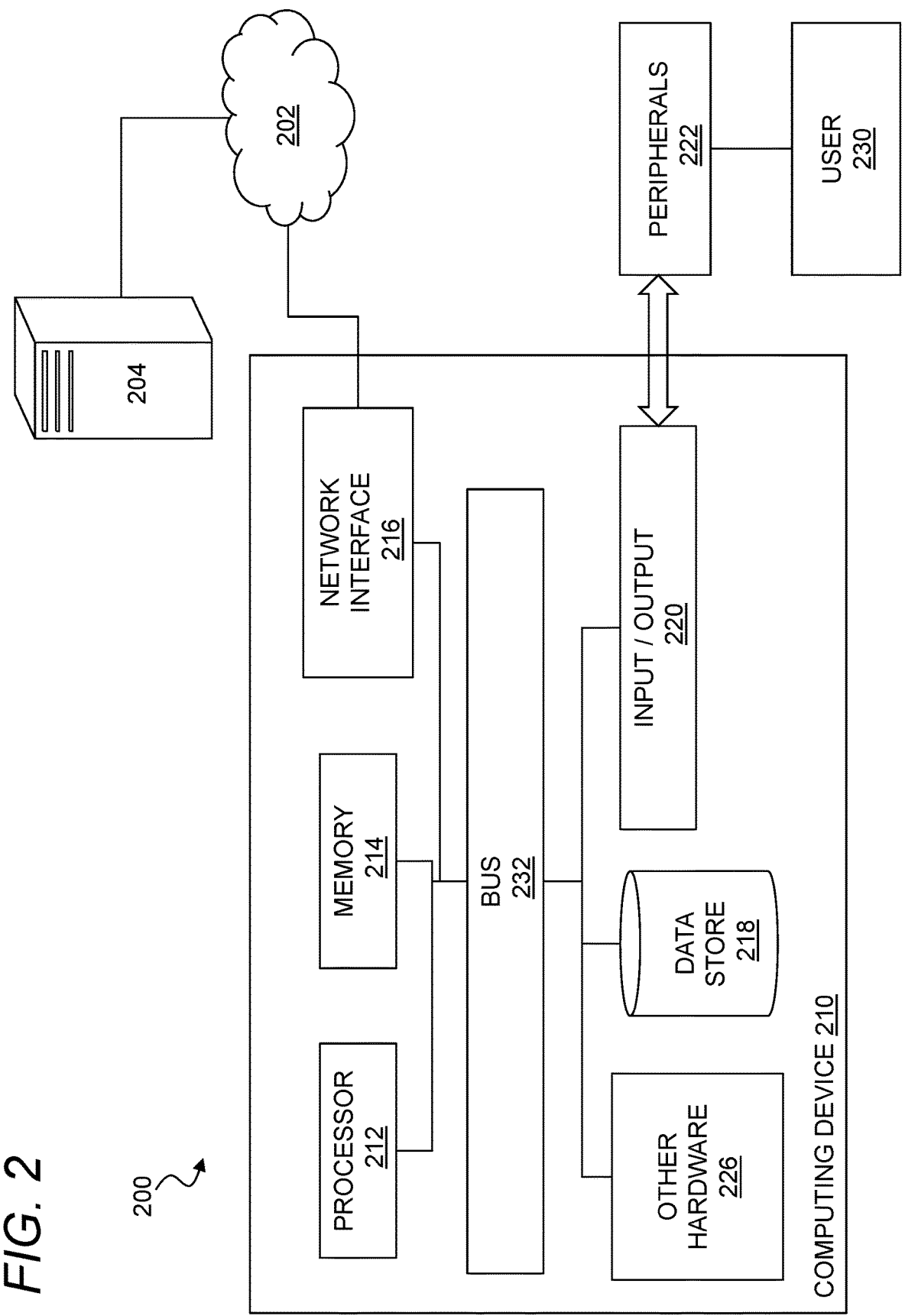
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
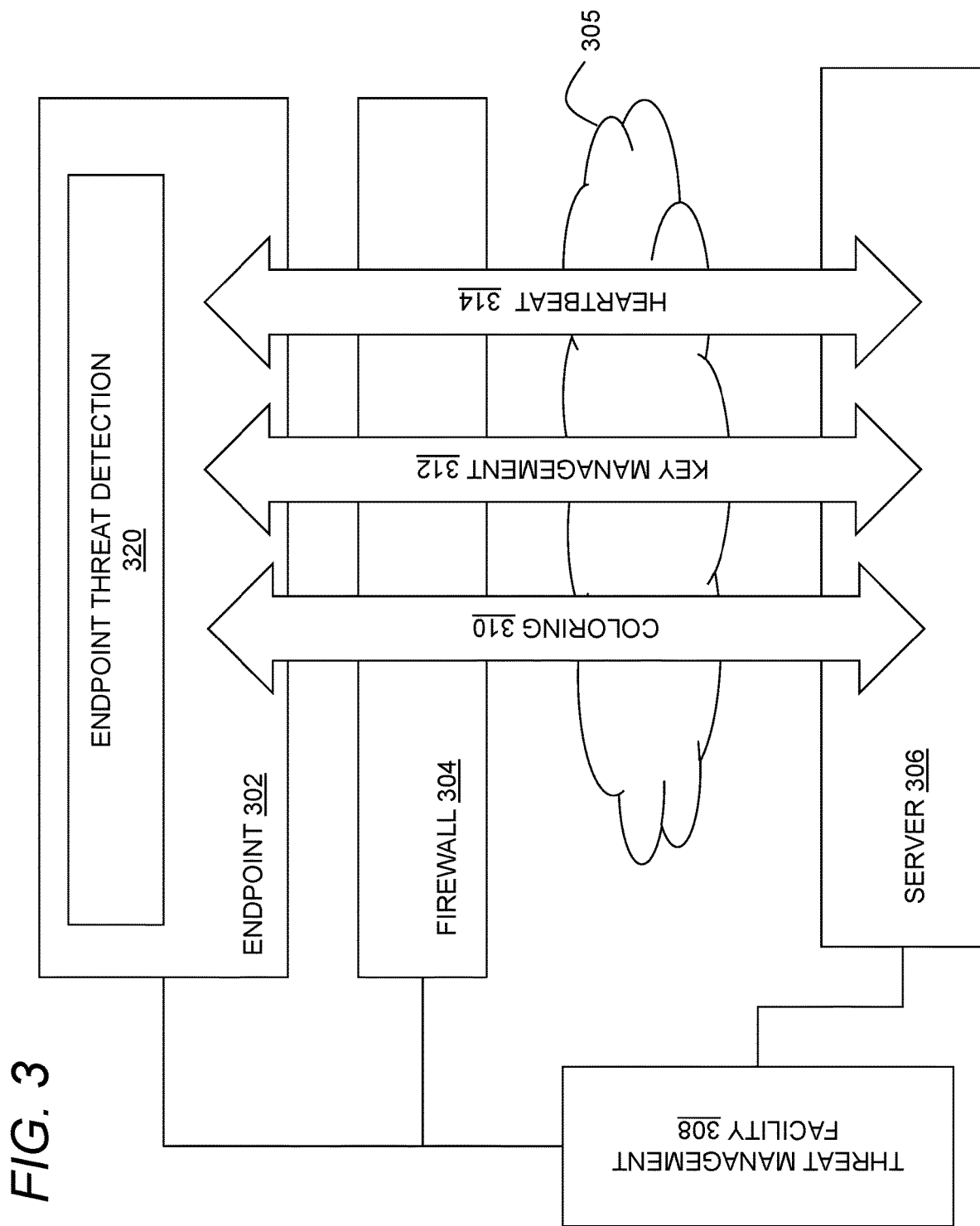
FIG. 3 illustrates a threat management system.

FIG. 3 illustrates a threat management system as contemplated herein. In general, the system may include an endpoint 302, a firewall 304, a server 306 and a threat management facility 308 coupled to one another directly or indirectly through a data network 305, all as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein. A suitable coloring system is described in greater detail below with reference to FIG. 4.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus, for example, if a particular process executing on the endpoint is compromised, or potentially compromised or otherwise under suspicion, keys to that process may be revoked in order to prevent, e.g., data leakage or other malicious activity. A suitable key management system useful in this context is described in greater detail below with reference to FIG. 5.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 308 to the threat management facility 308) or bidirectionally (e.g., between the endpoint 302 and the server 306, or any other pair of system components) on any useful schedule. A suitable heartbeat system is described in greater detail below with reference to FIG. 6.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
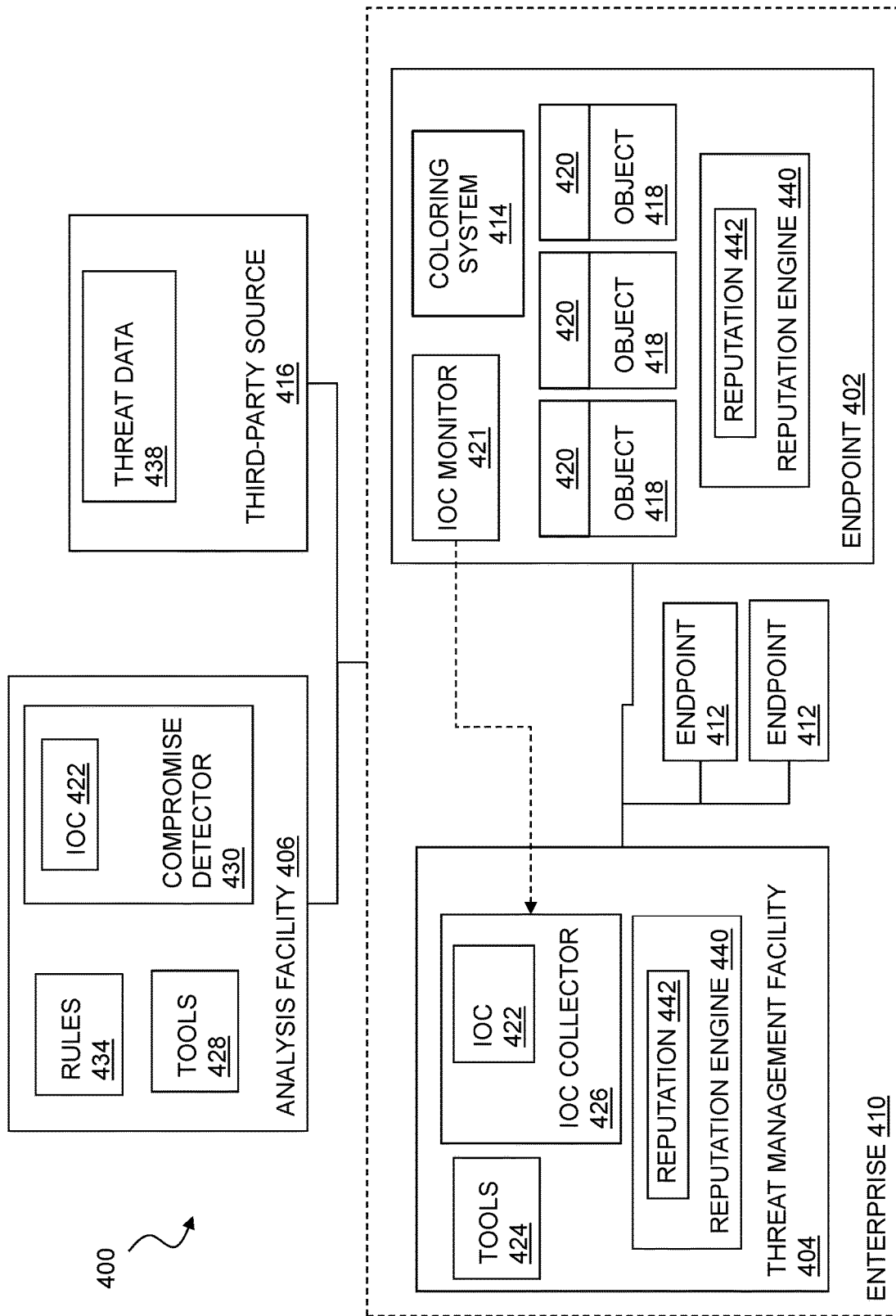
FIG. 4 illustrates a system for behavioral tracking, coloring, and generation of indications of compromise (IOCs).

FIG. 4 illustrates a system for behavioral tracking, coloring, and generation of indications of compromise (IOCs). In general, the system 400 may include a number of entities participating in a threat management process such as any of the entities and threat management processes described herein. The threat management process may for example employ techniques such as behavioral tracking, encryption, endpoint recording, reputation-based threat detection, behavioral-based threat detection, signature-based threat detection, and combinations of the foregoing, or any other suitable techniques for detecting threats to endpoints in a network.

In general, the system 400 may include a number of endpoints 402, 412 and a threat management facility 404 in an enterprise 410, such as any of the enterprises described above. An external analysis facility 406 may analyze threat data and provide rules and the like for use by the threat management facility 404 and endpoints 402, 412 in managing threats to the enterprise 410. The threat management facility 404 may reside in a local appliance (e.g., embedded within, or locally coupled to the endpoint 402), a virtual appliance (e.g., which could be run by a protected set of systems on their own network system(s)), a private cloud, a public cloud, and so forth. The analysis facility 406 may store locally-derived threat information. The analysis facility 406 may also or instead receive threat information from a third party source 416 such as MITRE Corporation or any other public, private, educational or other organization that gathers information on network threats and provides analysis and threat detection information for use by others. Each of these components may be configured with suitable programming to participate in the various threat detection and management techniques contemplated herein. The threat management facility 404 may monitor any stream of data from an endpoint 402 exclusively, or use the full context of intelligence from the stream of all protected endpoints 402, 412 or some combination of these.

The endpoint 402 may be any of the endpoints described herein, or any other device or network asset that might join or participate in the enterprise 410 or otherwise operate on an enterprise network. This may, for example, include a server, a client such as a desktop computer or a mobile computing device (e.g., a laptop computer, a wearable device, a tablet, and the like), a cellular phone, a smart phone, or other computing device suitable for participating in the enterprise 410.

In general, the endpoint 402 may include any number of computing objects such as an object 418 labeled with a descriptor 420. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

An object 418 may also or instead include a remote resource, such as a resource identified in a URL. That is, while the objects 418 in FIG. 4 are depicted as residing on the endpoint 402, an object 418 may also reside elsewhere in the system 400, while still being labeled with a descriptor 420 and tracked by the monitor 421 of the endpoint 402. The object 418 may be an item that is performing an action or causing an event, or the object 418 may be an item that is receiving the action or result of an event (i.e., the item in the system 400 being acted upon).

Where the object 418 is data or includes data, the object 418 may be encrypted or otherwise protected, or the object 418 may be unencrypted or otherwise unprotected. The object 418 may be a process or other computing object that performs an action, which may include a single event or a collection or sequence of events taken by a process. The object 418 may also or instead include an item such as a file or lines of code that are executable to perform such actions. The object 418 may also or instead include a computing component upon which an action is taken, e.g., a system setting (e.g., a registry key or the like), a data file, a URL, or the like. The object 418 may exhibit a behavior such as an interaction with another object or component of the system 400.

In one aspect, objects 418 may be described in terms of persistence. The object 418 may, for example, be a part of a process, and remain persistent as long as that process is alive. The object 418 may instead be persistent across an endpoint 402 and remain persistent as long as an endpoint 402 is active or alive. The object 418 may instead be a global object having persistence outside of an endpoint 418, such as a URL or a data store. In other words, the object 418 may be a persistent object with persistence outside of the endpoint.

Although many if not most objects 418 will typically be benign objects that may be found on a normal, operating endpoint, an object 418 may contain software associated with an advanced persistent threat (APT) or other malware that resides partially or entirely on the endpoint 402. The associated software may have reached the endpoint 402 in a variety of ways, and may have been placed manually or automatically on the endpoint 402 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 402. Further, the associated software may install from a file on the endpoint 402 (or a file remote from the endpoint 402), and the associated software may create one or more files such as data files or the like while executing. Associated software should be understood to generally include all such files and processes except where a specific file or process is more specifically noted.

A threat such as an APT may also take the form of an attack where no altered or additional software is directly added or modified on the endpoint 402. Instead, an adversary may reuse existing software on the system 400 to perform the attacks. It is for this reason that simply scanning for associated software may be insufficient for the detection of APTs and it may be preferable to detect APTs based on the behavior of the software and associated objects 418 that are used by, for, and with that software.

An object coloring system 414 may apply descriptors 420 to objects 418 on the endpoint 402. This may be performed continuously by a background process on the endpoint 402, or it may occur whenever an object 418 is involved in an action, such as when a process makes a call to an application programming interface (API) or takes some other action, or when a URL is used to initiate a network request, or when a read or a write is performed on data in a file. This may also or instead include a combination of these approaches as well as other approaches, such as by labeling a file or application when it is moved to the endpoint 402, or when the endpoint 402 is started up or instantiated. In general, the object coloring system 414 may add, remove or change a color at any location and at any moment that can be practicably instrumented on a computer system.

As noted above, the term 'object' as used herein is intended to include a wide range of computing objects and as such, the manner in which particular objects 418 are labeled or 'colored' with descriptors 420 may vary significantly. Any object 418 that is performing an action may be colored at the time of and/or with a label corresponding to the action, or likewise any object 418 that is the target of the action may be colored at the time that it is used and/or with a label corresponding to a process or the like using the object 418. Furthermore, the operating system runtime representation of the object 418 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 402. For processes, each file handle may be supplemented with a pointer or other mechanism for locating a descriptor 420 for a particular object 420 that is a process. More specifically, each object 418 may be colored in any manner suitable for appending information to that object 418 so that the corresponding descriptor 420 can be retrieved and, where appropriate, updated.

The coloring system 414 may apply any suitable rules for adding and changing descriptors 420 for objects 418. For example, when a process with a certain descriptor accesses data with a different descriptor, the descriptor for the process may be updated to correspond to the data, or the descriptor for the data may be updated to correspond to the process, or some combination of these. Any action by or upon an object 418 may trigger a coloring rule so that descriptors 420 can be revised at any relevant time(s) during processing.

In one aspect, colors will not explicitly indicate a compromised security state or other good/bad types of distinctions (although they may be adapted to this use). Instead, colors may record some known information or understanding about an object 418, such as a source, a purpose, and so forth. In this context, colors will not be used to label actual or potential security compromises, but to identify inconsistencies among interacting objects 418, and to restrict or control access and use accordingly. For example, where an endpoint uses file-system-based encryption as described herein, a process that is colored as exposed to external resources (e.g., the Internet) may be prohibited from accessing cleartext data for protected files. Colors can also be used in other contexts such as intrusion prevention, routing rules, and detection of odd or questionable behavior.

In one aspect, colors may be implemented as flags associated with objects 418 that provide a short hand cache of potentially relevant information. While this information could also be obtained for an object 418 through a careful inspection of related activity logs or other data recording activities, the use of a cache of flags for coloring information makes the coloring information directly available and immediately actionable, as distinguished from post hoc forensic activities that are otherwise supported by data logging.

In one aspect, colors as contemplated herein may fall into two different categories: static colors and dynamic colors. Static colors may be explicitly applied based on, e.g., a controlling application. For example, a static color may specify a status of an application or data, or an associated type of application (e.g., productivity, mail client, messaging, browser, word processing, financial, spreadsheet, etc.). In this context, a process will generally inherit static colors from a source executable, and will permit inferences for appropriate behavior and related processes. Dynamic colors may be assigned based on direct observation of executing processes, and may not be inherited or transferred among processes (although the presence of a dynamic color may be used to draw another coloring inference upon interaction with another process). Thus, the inheritance of colors may depend in part upon the type of color that is applied, or upon explicit inheritance rules provided for a particular color.

A descriptor 420 may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT' (e.g., untrusted). The specific content of the label is unimportant, and this may be a binary flag, text string, encrypted data or other human-readable and/or machine-readable identifier, provided that the descriptor 420 can facilitate discrimination among labeled files—in this example, between trusted objects 418 and untrusted objects 418 so that, e.g., trusted data can be selectively decrypted or encrypted for use with trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 420 may provide a multi-tiered or hierarchical description of the object 418 including any information useful for characterizing the object 418 in a threat management context. For example, in one useful configuration the descriptor 420 may include a type or category, static threat detection attributes, and an explicit identification. The type or category for the object 418 may be any category or the like that characterizes a general nature or use of the object 418 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application: spreadsheet,' 'application: word_processing,' and so forth. Such colors may be directly inferred from a single action, a sequence of actions, or a combination of actions and other colors, including, e.g., colors of processes and files related to a particular action, or other objects 418 that provide context for a particular action or group of actions. One or more colors may also or instead be explicitly provided by a user or a process, or otherwise automatically or manually attributed to computer objects as contemplated herein.

The static threat detection attributes may be any readily ascertainable characteristics of the object 418 useful in threat detection. This may, for example, include an antivirus signature, a hash, a file size, file privileges, a process user, a path or director, and so forth. Static threat detection attributes may also include attributes that are derived by or supplied from other sources. For example, static threat detection attributes may include a reputation for an object 418, which may be expressed in any suitable or useful level of granularity such as with discrete categories (trusted/untrusted/unknown) or with a numerical score or other quantitative indicator. The explicit identification may, in general, be what an object 418 calls itself, e.g., a file name or process name.

Some actions may transfer colors from the subject of the action to the target of the action. For example, when a process creates sub-processes, the sub-processes may inherit the colors of its parent(s). By way of another example, when a process is initially loaded from an executable, it may inherit the color(s) stored in the file system for or with the executable.

In general, the descriptor 420 may be provided in any suitable format. The descriptor 420 may for example be formed as a vector of binary flags or other attributes that form the 'color' or description of an object 418. The descriptor 420 may also, where appropriate, include scalar quantities for certain properties. For example, it may be relevant how many times a system file was accessed, how many file handles a process has open, how many times a remote resource was requested or how long a remote resource is connected, and this information may be suitably included in the descriptor 420 for use in coloring objects with the coloring system 414 and applying rules for IOC detection by the IOC monitor 421.

An indication of compromise (IOC) monitor 421 may be provided to instrument the endpoint 402 so that any observable actions by or involving various objects 418 can be detected. As with the coloring system 414, it will be understood that the types of observable actions will vary significantly, and the manner in which the endpoint 402 is instrumented to detect such actions will depend on the particular type of object 418. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may create suitable instrumentation for any computing object so that it may be monitored by the IOC monitor 421.

It will be noted that suitable instrumentation may be used for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 421 applies rules to determine when there is an IOC 422 suitable for reporting to a threat management facility 404. It will be understood that an endpoint 402 may, in suitable circumstances and with appropriate information, take immediate local action to remediate a threat. However, the monitor 421 may advantageously accumulate a sequence of actions, and still more advantageously may identify inconsistencies or unexpected behavior within a group of actions with improved sensitivity by comparing descriptors 420 for various objects 418 involved in relevant actions and events. In this manner, rules may be applied based upon the descriptors 420 that better discriminate malicious activity while reducing the quantity and frequency of information that must be communicated to a remote threat management facility 404. At the same time, all of the relevant information provided by the descriptors 420 can be sent in an IOC 422 when communicating a potential issue to the threat management facility 404. For example, during the course of execution, a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. When this last action is observed, an inconsistency in the various color descriptors between the subject of the action—the externally exposed browser process—and the target of the action may result in a well-defined IOC, which may be directly processed with immediate local action taken. The IOC may also or instead be reported externally as appropriate.

Thus, an endpoint 402 in an enterprise 410 may be instrumented with a coloring system 414 and monitor 421 to better detect potentially malicious activity using descriptors 420 that have been selected for relevance to threat detection along with a corresponding set of rules developed for the particular descriptors 420 that are being used to label or color various objects 418. By way of example, the object 418 may be a web browser that starts off being colored as a 'browser' and an 'internet facing' application. Based on this descriptor 420, a range of behaviors or actions may be considered normal, such as accessing remote network resources. However, if an object 418 colored with this descriptor 420 attempted to elevate privileges for a process, or to access a registry or system files, then this inconsistency in action may trigger a rule violation and result in an IOC 422.

In general, any action or series of actions that cumulatively invoke a particular reporting or action rule may be combined into an IOC 422 and communicated to the threat management facility 404. For example, an IOC 422 may include a malicious or strange behavior, or an indication of a malicious or strange behavior. The IOC 422 may be a normalized IOC that expresses one or more actions in a platform independent manner. That is, the IOC 422 may express a malicious behavior or suspected malicious behavior without reference to platform-specific information such as details of an operating system (e.g., iOS, MacOS, Windows, Android, Linux, and so forth), hardware, applications, naming conventions, and so forth. Thus, a normalized IOC may be suitable for identifying a particular threat across multiple platforms, and may include platform independent processes, actions, or behaviors, or may express such process, actions, or behaviors in a platform independent manner. The normalized IOC may be generated from the IOC 422, e.g., it may be a converted version of the IOC 422 suitable for use with multiple platforms, or it may simply be any IOC 422 that has been created in a platform independent form. Process colorization (i.e., using the coloring system 414) as described herein may be used to create a normalized IOC.

In general, a threat management facility 404 for the enterprise 410 may include an IOC collector 426 that receives the IOC 422 from the endpoint 402 and determines an appropriate action. This may include any suitable remedial action, or where one or more IOCs 422 are inconclusive, continued monitoring or increased monitoring as appropriate.

The threat management facility 404 may provide a variety of threat management or monitoring tools 424, any of which may be deployed in response to IOCs 422 collected by the IOC collector 426. These tools 424 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 406 may provide a remote processing resource for analyzing malicious activities and creating rules 434 suitable for detecting IOCs 422 based on objects 420 and descriptors 420. It is generally contemplated that suitable attributes of certain descriptors 418 and one or more rules 434 may be developed together so that objects 418 can be appropriately labeled with descriptors 420 that permit invocation of rules 434 and creation of IOCs 422 at appropriate times. The analysis facility 406 may include a variety of analysis tools 428 including, without limitation, tools for regular expression, whitelisting/blacklisting, crowd sourcing, identifiers, and so forth. The analysis tools 428 may also or instead include information and tools such as URL look-ups, genotypes, identities, file look-up, reputations, and so forth. The analysis facility 406 may also provide numerous related functions such as an interface for receiving information on new, unknown files or processes, and for testing of such code or content in a sandbox on the analysis facility 406.

The analysis facility 406 may also or instead include a compromise detector 430, where the compromise detector 430 is configured to receive new threat information for analysis and creation of new rules and descriptors as appropriate, as well as corresponding remedial actions. The compromise detector 430 may include any tools described herein or otherwise known in the art for detecting compromises or evaluating new threats in an enterprise 410.

In general, a rule 434 may be manually created with corresponding human-readable semantics, e.g., where a process is labeled as a browser process or other category or type that can be interpreted by a human. It should, however, be appreciated that the compromise detector 430 may also be configured to automatically generate descriptors 420 and rules 434 suitable for distribution to a threat management facility 404 and an endpoint 402. In this latter mode, the meaning of a particular descriptor 420 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 406 may be within an enterprise 410, or the analysis facility 406 may be external to the enterprise 410 and administered, for example, by a trusted third party. Further, a third-party source 416 may provide additional threat data 438 or analyses for use by the analysis facility 406 and the threat management facility 404. The third-party resource 416 may be a data resource that provides threat data 438 and analyses, where the threat data 438 is any data that is useful in detecting, monitoring, or analyzing threats. For example, the threat data 438 may include a database of threats, signatures, and the like. By way of example, the third-party resource 416 may be a resource provided by The MITRE Corporation.

The system 400 may include a reputation engine 440 storing a plurality of reputations 442. The reputation engine 440 may include a reputation management system for the generation, analysis, identification, editing, storing, etc., of reputations 442. The reputation engine 440 may include reputation-based filtering, which may be similar to the reputation filtering discussed above with reference to FIG. 1. The reputation engine 440 may be located on the threat management facility 404 or the endpoint 402 as shown in FIG. 4, or the reputation engine 440 may be located elsewhere in the system 400. The reputation engine 440 may receive an IOC 422 or a stream of IOCs 422, and may generate or utilize reputations 442 for the IOCs 422. The reputation engine 440 may also or instead receive actions, behaviors, events, interactions, and so forth, and may generate or utilize reputations 442 for any of the foregoing. The reputation engine 440 may generate or revise a reputation 442 based on behaviors, actions, events, interactions, IOCs 422, other reputations 442, a history of events, data, rules, state of encryption, colors, and so forth. The reputation engine 440 may utilize a third-party resource, e.g., for the third-party resource's reputation data.

The reputations 442 may include reputations for any of the objects 418 as described herein. In general, the reputations 442 may relate to the trustworthiness of the objects 418 or an attribute thereof (e.g., the source of the object 418, a behavior of the object 418, another object interacting with the object 418, and so forth). The reputations 442 may include lists of known sources of malware or known suspicious objects 418. The reputations 442 may also or instead include lists of known safe or trusted resources or objects 418. The reputations 442 may be stored in a reputations database included on the reputation engine 440 or located elsewhere in the system 400. The reputations 442 may be expressed in any suitable or useful level of granularity such as with discrete categories (e.g., trusted, untrusted, unknown, malicious, safe, etc.) or with a numerical score or other quantitative indicator. The reputations 442 may also be scaled.

In general, in the system 400 of FIG. 4, a malicious activity on the endpoint 402 may be detected by the IOC monitor 421, and a corresponding IOC 422 may be transmitted to the threat management facility 404 for remedial action as appropriate. The threat management facility 404 may further communicate one or more IOCs 422 to the analysis facility 406 for additional analyses and/or resolution of inconclusive results. Other details and variations are provided below. While the use of coloring and IOCs as contemplated herein can improve threat detection and remediation in a number of ways, the system 400 can be further improved with granular control over access to endpoint data using an encryption system. A system for key-based management of processes and files on an endpoint is now discussed in greater detail.

Figure 5:
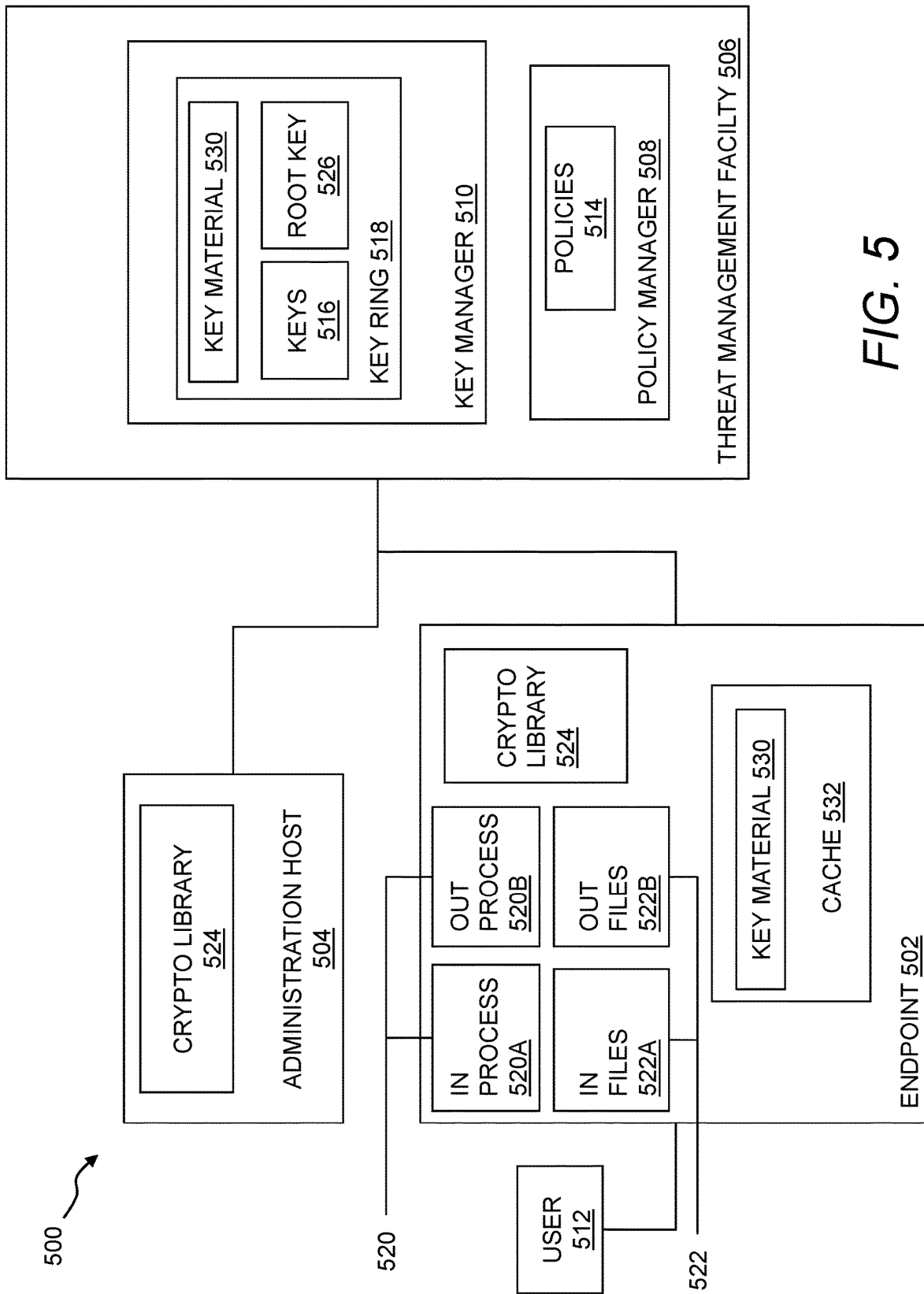
FIG. 5 illustrates a system for encryption management.

FIG. 5 illustrates a system for encryption management. Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be disposed in a cloud or the like.

The endpoints 502 may be any of the endpoints as described herein, e.g., with reference to the other figures. The endpoints 502 may also or instead include other end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG. 5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT. By coloring objects in this manner and basing key access on the corresponding color, the "IN" software objects may operate in a protected environment that objectively appears to be in compliance with the policies 514. Other files and processes may still be used on the endpoint 502, but they will operate in an "OUT" or unprotected environment that cannot obtain access to any of the "IN" content or functionality.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the entire endpoint 502 is OUT—that is, out of compliance with one or more policies 514, the endpoint 502 will not have key access or access to any protected content. Conversely, if the endpoint 502 is IN, the endpoint 502 may have access to protected content. Thus in one aspect, the notion of IN/OUT may be applied at an endpoint level, and data protection may be a consequence of endpoint protection. Endpoint protection may also or instead be applied at a more granular level, e.g., by determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include any policies 514 relating to secure operation of endpoints 502 in an enterprise. This may, for example, include hardware configuration policies, software configuration policies, communication policies, update policies, or any other policies relating to, e.g., the configuration of an endpoint 502, communications by an endpoint 502, software executing on an endpoint 502 and so forth. Policies 514 may include usage criteria based on, e.g., signatures, indications of compromise, reputation, user identity, and so forth. With respect to the key management system contemplated herein, the policies 514 may include a cryptographic protocol design, key servers, user procedures, and other relevant protocols, or these cryptographic protocols may be provided elsewhere for use by the policy manager 508. The policies 514 may also include any rules for compliance including those mentioned above or any other suitable rules or algorithms that can be applied to determine whether objects and components are 'IN' or 'OUT' as contemplated herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 516 may include cryptographic keys in a cryptosystem, i.e., decryption keys. In one aspect, the keys 516 may be disposed on one key ring 518 using one root key 526. In general, the keys 516 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), and so forth. The cryptosystem may also or instead include any suitable public key infrastructure or the like supporting the distribution and use of keys for encryption, digital signatures, and so forth.

The key ring 518 may facilitate simplified management of the system 500. For example, by reducing the data protection system down to a single key ring 518, the system can eliminate or reduce the overhead for management of keys 516. In one aspect, all of the data on a key ring 518 is protected by one root key 526. By reducing the data protection system down to a single key ring 518 protected by one root key 526, all privileged users 512 on uncompromised platforms can have access to all protected data. In this embodiment, data is either 'IN' (i.e., encrypted), or it's 'OUT' (i.e., not encrypted). In one aspect, the default system does not include any additional shade of access control.

The cryptography library 524 may be disposed on the administration host 504 as shown in FIG. 5. The cryptography library 524 may also be disposed on the endpoint 502, e.g., in a web browser, or it may be disposed on another component of the system 500, or any combination of these. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein. As noted above, an enterprise that systematically uses coloring and indications of compromise can be improved through the use of a key management system as contemplated herein. This system may be still further improved with the addition of a heartbeat system that communicates heartbeats from an endpoint containing health and status information about the endpoint. A suitable heartbeat system is now described in greater detail.

Figure 6:
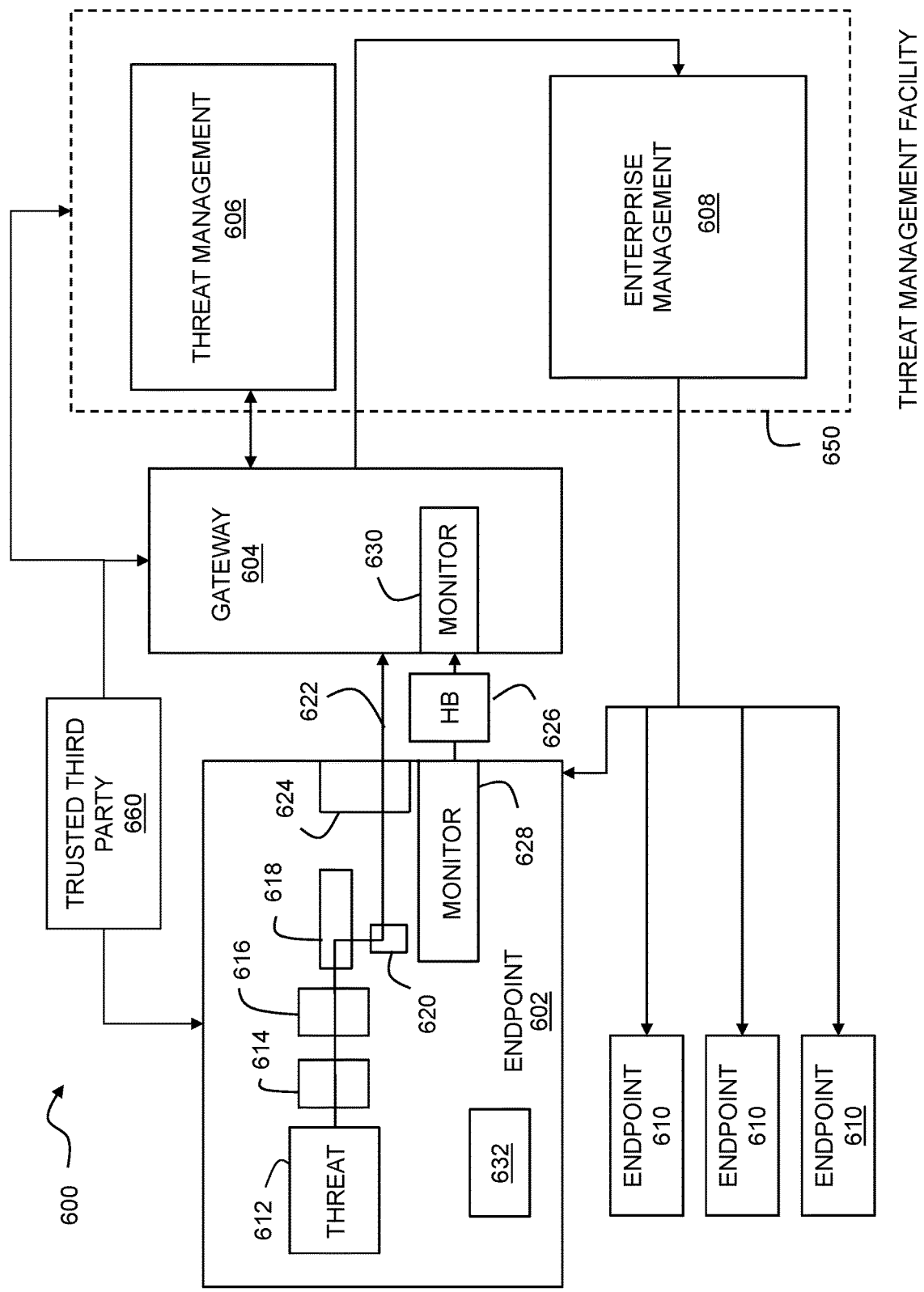
FIG. 6 illustrates a threat management system using heartbeats.

FIG. 6 illustrates a threat management system using heartbeats. In general, a system 600 may include an endpoint 602, a gateway 604, a threat management system 606, and an enterprise management system 608 that manages an enterprise including the endpoint 602, the gateway 604, and one or more additional endpoints 610. Each of these components may be configured with suitable programming to participate in the detection and remediation of an advanced persistent threat (APT) or other malware threat as contemplated herein. Although the term "gateway" is used for the device between an endpoint and an external network, it will be appreciated that this device may also or instead include a switch, router, firewall, and/or other network elements, any of which may be included in the "gateway" as that term is used herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, log a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a health monitor 628 within the endpoint 602, and may be transmitted to a remote health monitor 630, for example, at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise polices, and other evaluation techniques. The remote health monitor 630 may also or instead be provided at the threat management facility 650, for example as part of the threat management system 606 or the enterprise management system 608.

The heartbeat 626 may be secured in any suitable manner so that the health monitor 630 can reliably confirm the source of the heartbeat 626 and the status of the endpoint 602. To this end, the heartbeat 626 may be cryptographically signed or secured using a private key so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard or varying algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A disappearance of the heartbeat 626 from the endpoint 602 may indicate that the endpoint 602 has been compromised; however this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 6 as a threat management facility 650 that includes the threat management system 606 and the enterprise management system 608. It will be understood that either or both of these system may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for advanced persistent threats as contemplated herein. It also should be understood that the heartbeat may be monitored and/or managed by the threat management system 606, the enterprise management system 608, or another component of the threat management facility 650.

The system 600 may include a certificate authority 660 or similar trust authority or the like (shown as a "trusted third party" in the figure). In order to provide a meaningfully secure heartbeat 626, the heartbeat 626 may be secured with reference to a trusted authority such as a certificate authority 660 that can issue cryptographic certificates allowing other entities to rely on assertions about identity (e.g., by enabling verification with a trusted third party), and to enable cryptographically secure communications. The cryptographic techniques for creating and using such certificates and relationships are well known, and are not repeated here. The certificate authority 660 may be administered by the enterprise management system 608 or some other internal resource of the enterprise, or the certificate authority 660 may be administered by a trusted third party such as any of a variety of commercially available certificate authorities or the like. Thus, the certificate authority 660, or some other similar cloud service or the like, may operate as a security broker to register, e.g., endpoints 602, 610, the gateway 604, the threat management facility 650, and so forth, and provide cryptographic material for each of the other trusting entities to securely communicate with one another.

Once registered with the certificate authority 660 in this fashion, the heartbeat may be used to establish trust between the endpoint 602 and other entities, and to validate the source of the heartbeat 626 when it is received. More generally, a heartbeat 626 secured in this manner may provide an encrypted channel between network entities such as an endpoint 602 and the gateway 604 (or a firewall or the like). The nature of the communication may provide a technique for validating the source, as well as obfuscating the contents with encryption. Thus when, for example, the endpoint 602 provides information about a good/healthy state or a bad/compromised state, the recipient may rely on this state information and act accordingly.

Figure 7:
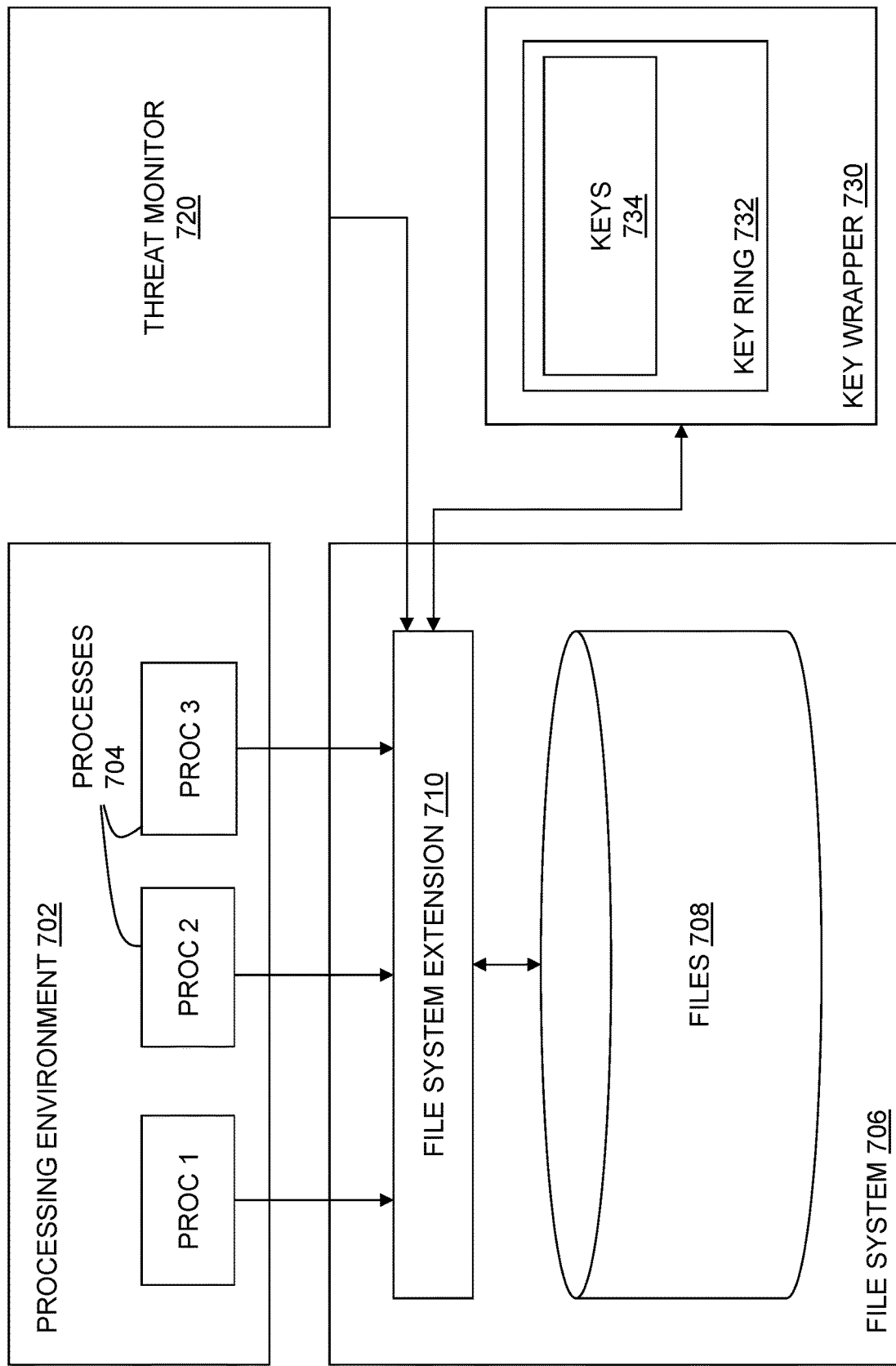
FIG. 7 shows an architecture for endpoint protection in an enterprise network security system.

FIG. 7 shows an architecture for endpoint protection in an enterprise network security system. In general, an endpoint may include a processing environment 702, a file system 706, a threat monitor 720 and a key wrapper 730.

The processing environment 702 may, for example, be any environment such as an operating system or the like suitable for executing one or more processes 704.

Each process 704 may be an instance of a computer program, portion of a computer program or other code executing within the processing environment 702. A process 704 may execute, e.g., on a processor, group of processors, or other processing circuitry or platform for executing computer-executable code. A process 704 may include executable computer code, as well as an allocation of memory, file descriptors or handles for data sources and sinks, security attributes such as an owner and any associated permissions, and a context including the content of physical memory used by the process 704. More generally, a process 704 may include any code executing on an endpoint such as any of the endpoints described herein.

The file system 706 is generally associated with an operating system that provides the processing environment 702, and serves as an intermediary between processes 704 executing in the processing environment 702 and one or more files 708 stored on the endpoint. The file system 706 may provide a directory structure or other construct to facilitate organization of the files 708, and the file system 706 generally supports file functions such as creating, deleting, opening, closing, reading, writing, and so forth.

An extension 710 may be included in the file system 706 by modifying the operating system kernel. While other programming techniques may be employed to perform the functions of an extension 710 as contemplated herein, direct modifications to or additions to the operating system permit the extension 710 to operate transparently to the processing environment 702 and the processes 704 without requiring any modifications or adaptations. The extension 710 may, for example, be implemented as a file system filter (in a MICROSOFT WINDOWS environment) or a mount point to a directory (in an APPLE IOS environment). The extension 710 to the files system as contemplated herein performs two concurrent functions. First, the extension 710 communicates with a threat monitor 720 in order to receive updates on the security status and exposure status of the processes 704 or the endpoint. Second the extension 710 communicates with a key wrapper 730 that provides key material for encrypting and decrypting data in the files 708. Finally, the extension 710 operates to conditionally provide encryption and decryption of the files 708 for the processes 704 based on a current security or exposure state, as described in greater detail below.

The threat monitor 720 may include any suitable threat monitoring, malware detection, antivirus program or the like suitable for monitoring and reporting on a security state of an endpoint or individual processes 704 executing thereon. This may include local threat monitoring using, e.g., behavioral analysis or static analysis. The threat monitor 720 may also or instead use reputation to evaluate the security state of processes 704 based on the processes 704 themselves, source files or executable code for the processes 704, or network activity initiated by the processes 704. For example, if a process 704 requests data from a remote URL that is known to have a bad reputation, this information may be used to infer a compromised security state of the endpoint. While a threat monitor 720 may operate locally, the threat monitor 720 may also or instead use remote resources such as a gateway carrying traffic to and from the endpoint, or a remote threat management facility that provides reputation information, malware signatures, policy information and the like for the endpoint and other devices within an enterprise such as the enterprise described above.

In general, the threat monitor 720 provides monitoring of a security state and an exposure state of the endpoint. The security state may, for example, be 'compromised', 'secure', or some other state or combination of states. This may be based on detections of known malware, suspicious activity, policy violations and so forth. The exposure state may be 'exposed' or 'unexposed', reflecting whether or not a particular process 704 or file 708 has been exposed to potentially unsafe content. Thus, exposure may not necessarily represent a specific threat, but the potential for exposure to unsafe content. This may be tracked in a variety of ways, such as by using the coloring system described above with reference to FIG. 5.

The key wrapper 730 may contain a key ring 732 with one or more keys 734 for encrypting and decrypting files 708. The key ring 732 may be cryptographically protected within the key wrapper 730 in order to prevent malicious access thereto, and the key wrapper 730 may communicate with the interface to provide keys 734 for accessing the files 708 at appropriate times, depending, for example, on whether processes 704 are secure or exposed. In one aspect, the files 708 are stored in a non-volatile memory such as a disk drive, or in a random access memory that provides a cache for the disk drive, and the key wrapper 730 may be stored in a separate physical memory such as a volatile memory accessible to the operating system and the extension 710 but not to processes 704 executing in the user space of the processing environment 702.

In one aspect, every document or file on the endpoint may have a separate key. This may be, for example, a unique, symmetric key that can be used for encryption and decryption of the corresponding file. The key wrapper 730 may control access to the key material for encrypting and decrypting individual files, and may be used by the extension 710 to control access by individual processes 704 executing on the endpoint. As described herein, the extension 710 may generally control access to files 708 based on an exposure state, a security state, or other context such as the user of a calling process or the like. In the event of a severe compromise, or a detection of a compromise independent of particular processes, a key shredding procedure may be invoked to destroy the entire key wrapper 730 immediately and prevent any further access to the files 708. In such circumstances, the keys can only be recovered by the endpoint when a remediation is confirmed. Alternatively, the files may be accessed directly and decrypted from a secure, remote resource that can access the keys 734.

Figure 8:
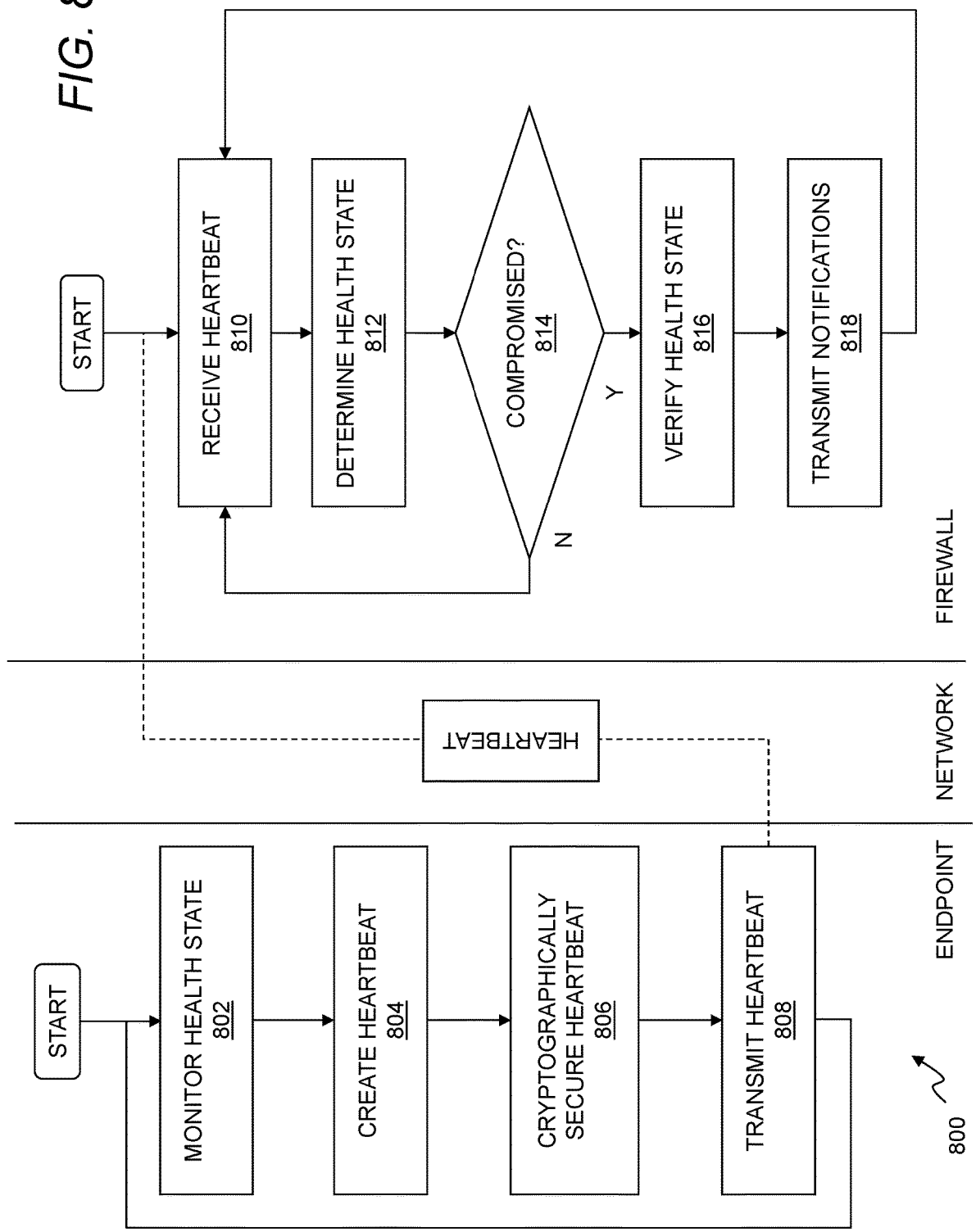
FIG. 8 shows a method for proactive network security using a health heartbeat.

FIG. 8 shows a method for proactive network security using a health heartbeat. In general, a system that provides a heartbeat from endpoints containing system health information, such as the system described above with reference to FIG. 6, may be used to proactively advertise compromised states within a network and beyond. For example, an endpoint may include health state information indicating a compromised (or potentially compromised) state, and may communicate this to a gateway, firewall, or other network device, or directly to other endpoints. Similarly, recipients may use indications of compromised states to proactively terminate network communications by compromised endpoints. This technique may advantageously facilitate the proactive isolation of compromised network assets. As another advantage, this technique may be implemented without a centralized switch or firewall, and may permit isolation of network assets even in a shared medium network such as an Ethernet or WiFi local area network, as well as within a peer-to-peer networks or other decentralized networking platforms.

As shown in step 802, the process 800 for operating an endpoint may begin with locally monitoring a health state of the endpoint. This may include any form of monitoring such as by applying behavioral analysis or static analysis to processes executing on the endpoint, as well as monitoring using any of the coloring techniques described herein, e.g., to identify inconsistencies among data and processes, exposure to potentially harmful content, and so forth.

As shown in step 804, the process 800 may include periodically creating a heartbeat encoding the health state. The heartbeat may, of course, encode other information such as a time, a date, a network address, and the like useful for logging the heartbeat and, where appropriate, using the heartbeat in combination with other heartbeat information from the endpoint or other endpoints. The heartbeat may also or instead encode information about machine status including, without limitation, a machine name or other machine identifier, a user logged into the machine, applications or processes executing on the machine, and so forth. The health state may usefully include any health information. For example, this may include a general indicator, e.g., that the endpoint is not compromised, is potentially compromised, is compromised, or is in an unknown health state.

The health state may more generally be based on any indicia of actual compromise or potential compromise of the endpoint.

In general, the heartbeat may be created on any suitable schedule, which may include a fixed schedule, a variable schedule, an event driven schedule, and so forth, as well as any combination of these. Thus, for example, a heartbeat may be created on a fixed schedule (e.g., every ten minutes), and also whenever a new application is installed, or whenever explicitly requested by the firewall or gateway. In another aspect, a rate of heartbeat creation may change over time according to operation of the endpoint, such as by increasing the rate when an increased possibility of a compromised state is detected, but a compromised state has not yet been confirmed. Thus, the term "periodically" as used herein should not be understood to imply a particular, fixed schedule, but rather should encompass any type of fixed or varying interval of heartbeats that might be usefully employed by an endpoint in a network as contemplated herein.

When the health state is a compromised state, creating the heartbeat may include encoding an instruction in the heartbeat to proactively terminate communications by other devices on the network with the endpoint. In a local area network context, the heartbeat may be broadcast (e.g., in the transmitting step below) through the network, and/or communicated directly to other endpoints within the network for immediate local action.

As shown in step 806, the process 800 may include cryptographically securing the heartbeat. This may, for example, include digitally signing the heartbeat, e.g., using a key provided by the certificate authority described herein, so that the endpoint can be verified as the source of the heartbeat. This may also or instead include encrypting some or all of the contents of the heartbeat. For example, a machine identifier or user credentials might be encrypted to prevent interception and then placed in the heartbeat for communication to a gateway or the like.

As shown in step 808, the process 800 may include transmitting the heartbeat to one or more other devices connected in a communicating relationship with the endpoint. This may, for example, include devices such as a second endpoint connected to the endpoint through a local area network or a peer-to-peer network, either through point-to-point communications, or through a broadcast over the network to any number of other endpoints. This may also or instead include transmitting the heartbeat to a firewall, a router, a gateway (e.g., for an enterprise network to which the endpoint belongs), a switch or any other network device or the like. The process 800 may also or instead include transmitting the heartbeat to a threat management facility such as any of the threat management facilities described herein. In this context, any remedial action may be centrally managed by the threat management facility if/when appropriate. After the heartbeat has been transmitted, the process 800 may return to step 802 where health state monitoring may continue.

The process for the endpoint described above may be repeated indefinitely, e.g., so long as the endpoint is powered on and coupled to the network, and may recur as frequently as necessary or appropriate for the schedule of the heartbeat. In one aspect, there is disclosed herein an endpoint that generates periodic heartbeats as described herein. The endpoint may include a network interface configured to couple in a communicating relationship with one or more devices through a network, a memory, and a processor. The processor may be configured by computer executable code stored in the memory to perform the steps of monitoring a health state of the endpoint, periodically creating a heartbeat encoding the health state, when the health state is a compromised state, encoding an instruction in the heartbeat to proactively terminate communications by other devices on the network with the endpoint, and transmitting the heartbeat to one or more other devices connected in a communicating relationship with the endpoint through a network.

Having described an example of operation of an endpoint that periodically creates a heartbeat encoding health state information, the description now turns to a recipient of that heartbeat. This may be a firewall (as shown in FIG. 8), or any other network element, or one or more other endpoints within a network.

As shown in step 810, the process 800 for receiving the heartbeat may begin with receiving a heartbeat at a network device from a first endpoint coupled to a network. The network device may include any device that might be coupled to the network and usefully configured to receive the heartbeat, such as a second endpoint coupled to the network, a firewall, a router, a gateway, a switch, or the like. In another aspect, the method may be performed by a local firewall for the endpoint. Thus, receiving the heartbeat may also or instead include receiving the heartbeat at a firewall of the endpoint that created the heartbeat. As noted above, the heartbeat may include a cryptographically secured heartbeat containing signed information about the health state of the first endpoint.

The network may be an enterprise network as described herein, or any other network such as, for example, a local area network such as a WiFi or Ethernet local area network using a shared physical medium, or a peer-to-peer network, a virtual private network, and so forth. For a local area network, the heartbeat may be broadcast directly from the source endpoint to other endpoints connected to the local network. It will be appreciated that, while a heartbeat from a single endpoint is illustrated, any number of endpoints or other devices may concurrently or sequentially provide heartbeats to the firewall or other recipient(s).

As shown in step 812, the process 800 may include determining a health state of the endpoint based on the heartbeat. This may, for example, include decrypting the contents of the heartbeat, verifying a signature of the heartbeat, or any other suitable steps. In an aspect, the health state may be explicitly encoded into the heartbeat. In another aspect, indicia of health may be included in the heartbeat, and the recipient may independently assess whether to treat the endpoint as compromised. In an aspect, the health state may be based on an indicia of potential compromised contained in the heartbeat, that is, an elevated likelihood of compromise without a final conclusion concerning the health state.

However encoded, determining the health state may generally include extracting the health state information from the heartbeat, and/or inferring the health state information based on a characteristic of the heartbeat. A variety of characteristics may indicate or suggest conditions permitting an accurate inference of a compromised health state. For example, the characteristic may include an omission of a subsequent heartbeat from the endpoint concurrent with other network traffic from the endpoint. The characteristic may also or instead include a replay of a prior heartbeat, a signature defect in the heartbeat, or any other characteristic or combination of characteristics indicative of a compromised endpoint.

As shown in step 814, if the health state is not compromised, the process 800 may return to step 810 where a next heartbeat may be received. If the health state is compromised, the process 800 may proceed to step 816 where additional action may be taken.

As shown in step 816, the process 800 may include verifying a health state of the endpoint. For example, if the endpoint reports a compromised state in the heartbeat, the recipient may take an additional step of querying the endpoint directly to verify the health state, or reviewing previous heartbeats from the endpoint for related contextual information.

As shown in step 818, the process 800 may include transmitting a notification to one or more other devices on the network. This may, for example, include an explicit instruction to terminate communications with the endpoint, or this may include a statement of the health state that permits autonomous response by any and all recipients, or some combination of these. In general, steps 810-818 may be performed by any suitable network device, and as such, transmitting the notification may include transmitting the notification from at least one of a remote network service, the endpoint (e.g., from an internal firewall for the endpoint), a router, a firewall, a gateway, a switch, or the like. Transmitting the notification may include transmitting the notification to one or more other endpoints coupled to the network, or to any other suitable recipient such as a threat management facility or the like. For communication to other endpoints within a network, transmitting the notification may include broadcasting the notification. Transmitting the notification may also or instead include transmitting the notification of the compromised state to a threat management facility for the network, or transmitting an instruction to a gateway for the network to block traffic to and from the first endpoint through the gateway.

After transmitting any suitable notifications or instructions, the process 800 for the recipient may return to step 810 where a next heartbeat may be received.

Thus, there is disclosed herein a network device that may receive a heartbeat and process the heartbeat, e.g., as described above. In one aspect, a network device disclosed herein includes a first interface configured to couple in a communicating relationship with a first endpoint through a network, a second interface configured to couple in a communication relationship with one or more other devices through the network, a memory, and a processor. The processor may be configured by computer executable code stored in the memory to identify compromised assets in the network by performing the steps of receiving a heartbeat from the first endpoint, determining a health state of the first endpoint based on the heartbeat, and if the health state is a compromised state, transmitting a notification to the one or more other devices to terminate communications with the first endpoint. The network device may, for example, be a gateway for the network (e.g., to another network), a router for a local area network coupling the first endpoint to the one or more other devices, a firewall for the network, or any other suitable network device or combination of the foregoing.

In another aspect, a network device contemplated herein includes a first interface configured to couple in a communicating relationship with a first endpoint through a network, a second interface configured to couple in a communication relationship with one or more other devices through the network, a memory, and a processor. The processor may be configured by computer executable code stored in the memory to identify compromised assets in the network by performing the steps of receiving a heartbeat from the first endpoint, determining a health state of the first endpoint based on the heartbeat, and if the health state is a compromised state, preventing further communications on the network by the first endpoint through the network device.

Figure 9:
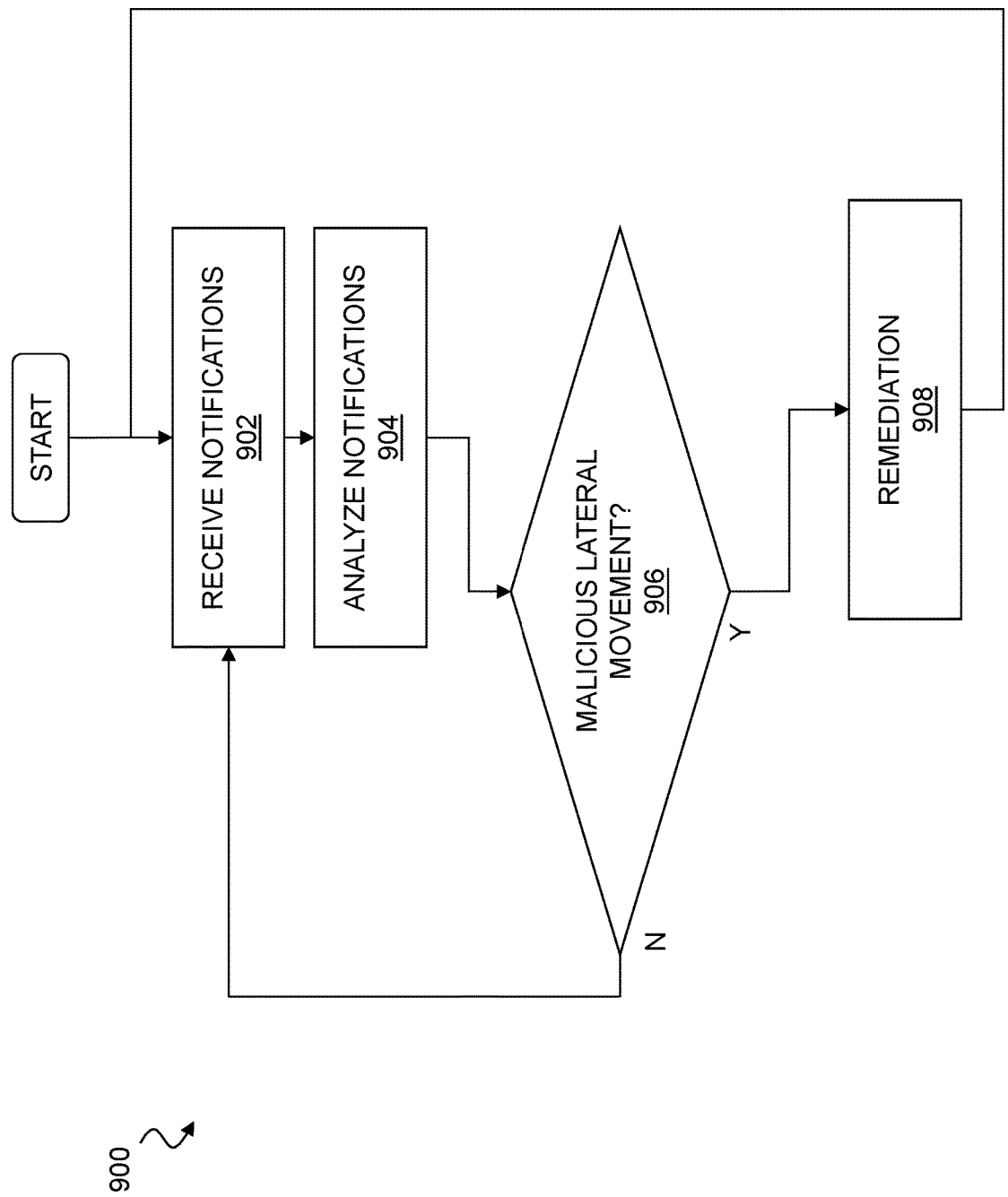
FIG. 9 shows a method for detecting malicious lateral movement in a network.

FIG. 9 shows a process for detecting malicious lateral movement in a network. In general, a human or automated attacker may establish a beachhead within a network, e.g., at a relatively easy point of entry, and then attempt to laterally move within the network to more secure areas and/or sources of more valuable, confidential, or otherwise sensitive information. One form of lateral movement involves logging in to one endpoint on the network from another endpoint on the network. By monitoring patterns of login attempts (typically failed login attempts), malicious lateral movement attempts can be detected before lateral movement is achieved. In general, this technique may be used alone, or in combination with other malware detection techniques described herein.

As shown in step 902, the process 900 may include collecting notifications from each of a plurality of endpoints relating to activity with other ones of the plurality of endpoints in a network. The notifications may, for example, include notifications of failed login attempts, which may be reported from an endpoint that failed in an attempt to login at a remote machine, the remote machine (e.g., a second endpoint) at which the login attempt failed, or some combination of these. Notifications may, for example, be collected at a firewall, a gateway, or another network device, or at a cloud resource such as a cloud-based threat management facility, e.g., configured to identify patterns of malicious login behavior. The notifications may be based on authentication logs stored in memory on each of the plurality of endpoints, and may be communicated in real time (e.g., as each login attempt occurs) or in batches, which may be triggered by a schedule or some local event such as multiple, temporally adjacent login attempts from a single endpoint. In one aspect, the notification may be triggered by a network protocol used for an authentication attempt, where each authentication attempt presented using a particular network protocol causes a notification to be communicated. In another aspect, a particular failure pattern for a number of different attempts causes the notification to be triggered. Thus, for example, an unusually large number of consecutive login attempts in a short amount of time, or a rotation through a suspicious collection of different credentials or passwords, may serve as the basis for a notification.

As shown in step 904, the process 900 may include analyzing the notifications in any suitable manner. A number of patterns may commonly recur when a malicious actor (human or automated) attempts to move laterally within a network. For example, one pattern of attack involves a high frequency of failed logins at a particular location using a sequence of different credentials. Another pattern attempts to obfuscate this activity by rotating logins sequentially around a number of different network locations while using common passwords, or a single password that might have been improperly obtained. Thus, in one aspect, analyzing the notifications may include analyzing the notifications to identify a malicious lateral movement, or a malicious attempt at lateral movement, from a compromised endpoint of the plurality of endpoints. The identification may be based on a pattern in the notifications such as any of the patterns described herein. Other patterns, such as a speed of data entry or login attempts exceeding ordinary manual activity, may also or instead be employed. More generally, a malicious attempt at lateral movement may be associated with malware executing on the compromised endpoint, a compromised application on the compromised endpoint, or a malicious use of a user identity on the compromised endpoint, and the notifications may be analyzed for patterns indicating any or all of these types of lateral movement attempts.

The techniques described herein may advantageously permit the identification of malicious activity before improper access is gained and a security compromise such as malware installation or data exfiltration occurs. Further advantages may accrue by monitoring activity across a number of endpoints, which can improve sensitivity to attacks that rotate access attempts across a number of different network assets.

As shown in step 906, a determination may be made whether the pattern identified in step 904 indicates a presence of an attack including a malicious attempt at lateral movement from a compromised endpoint. When the pattern does not suggest any attempts at malicious lateral movement, the process 900 may return to step 902 where additional notifications may be received.

As shown in step 908, when the pattern of notifications indicates a presence of a malicious attempt at lateral movement, the process 900 may include any suitable remediation. For example, remediation may include isolating the compromised endpoint from other ones of the plurality of endpoints in the network to prevent lateral movement from the endpoint. Remediation may also or instead include the creation of a falsified, attractive asset to draw the malicious activity toward a resource where the malicious activity can be tracked more closely, or from where countermeasures can be deployed. In another aspect, remediation may include remediating the compromised endpoint by removing a malware component associated with the attack. This may also or instead include killing a process associated with the attack, killing an application associated with the attack, initiating a root cause analysis for the attack, or notifying a security resource such as a threat management facility of the attack. Similarly, steps may be taken to address a user, such as by terminating a user session associated with the attack, revoking user credentials for a current user of the endpoint, or requiring a step-up authentication for the endpoint (e.g., by requiring manual re-entry of credentials, by presenting a security question, or some other user verification procedure).

According to the foregoing, there is disclosed herein a system for detecting malicious lateral movement attempts. The system may include a number of endpoints, each instrumented to transmit notifications of failed login attempts as generally described herein. The system may also include a device coupled to the endpoints through a network and configured (e.g., with computer executable code stored in a memory of the device and executable on a processor of the device) to receive the notifications from each of the plurality of endpoints over the network, and to identify a malicious lateral movement attempt from a compromised endpoint of the plurality of endpoints to another one of the plurality of endpoints based on a pattern in the notifications. The device may include a firewall, a gateway, or any other network device.

As described above, the notifications may generally be transmitted from originators of the failed login attempts (e.g., an endpoint that attempts to login to another endpoint) or the recipient of the failed login attempts. The pattern of interest may be based on a pattern of login attempts received at a particular machine, such as a pattern indicating a machine-initiated sequence of login attempts. In another aspect, the pattern may be a pattern suggesting a spray attack in which a compromised endpoint attempts a small number of logins consecutively at a number of different ones of the plurality of endpoints. The small number of logins may, for example, use a weak password such as a commonly used password with a higher than normal probability of success, where the compromised endpoint rotates through a number of available endpoints on the network with high-probability credentials.

Figure 10:
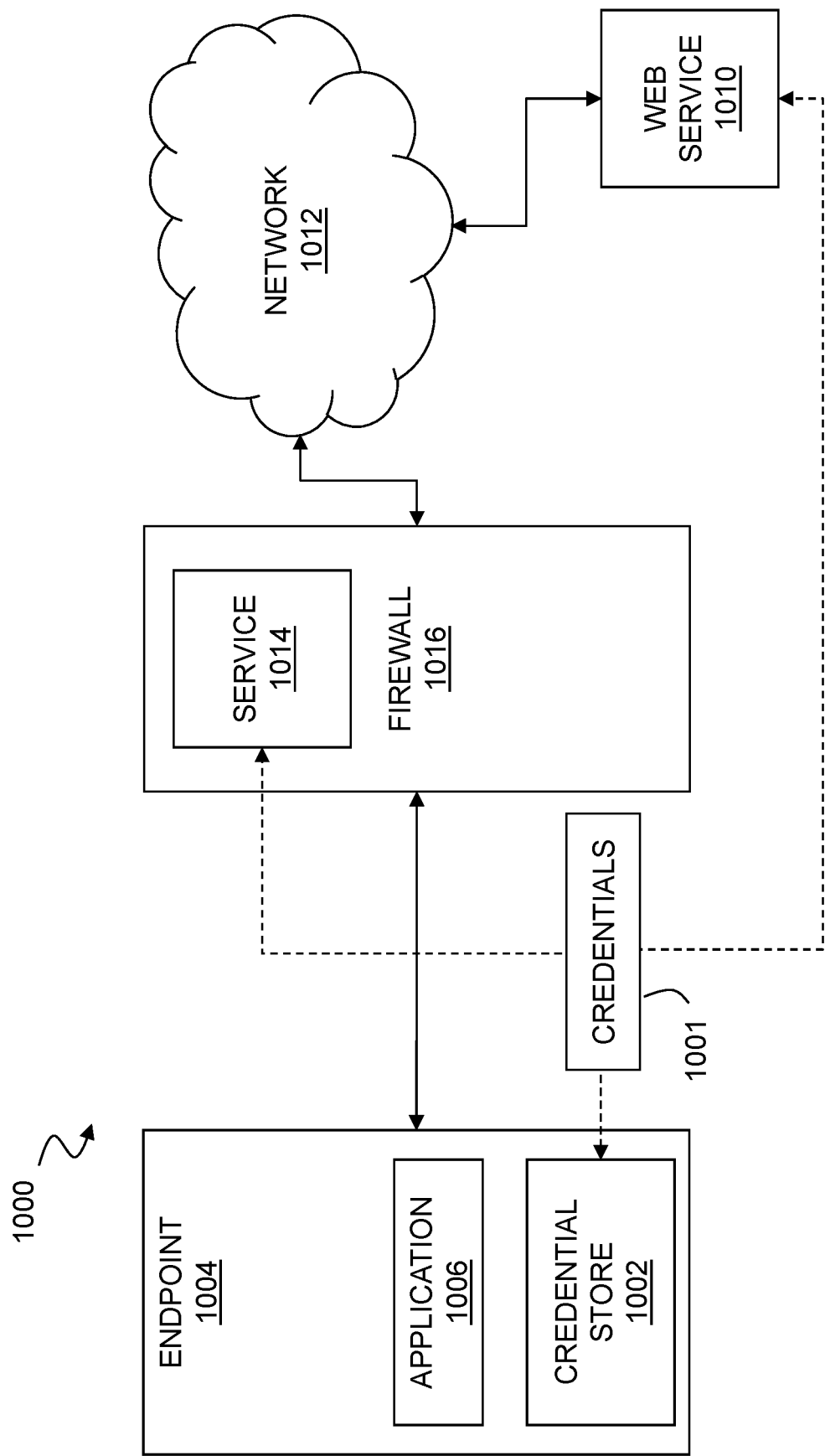
FIG. 10 shows a system for baiting endpoints to improve detection of authentication attacks.

FIG. 10 shows a system 1000 for baiting endpoints to improve detection of authentication attacks. In one form of an authentication attack, an attacker gains access to a machine, and then uses seemingly legitimate access to a credential store on that machine to access other resources identified in the credential store. Thus, for example, a compromised machine may be used to access web sites, web services, data stores, and so forth where the corresponding credentials have been stored in a credential store for automated use on a machine.

In order to address this attack, credentials 1001 for accessing a remote service may be created and stored in the credential store of an endpoint 1004 for use by an application 1006 on the endpoint 1004 to access the remote service. This may, for example, include a web service 1010 accessible through a network 1012 such as the Internet, or this may include a dedicated trapping service 1014 executing on a firewall 1016 or some other similar device such as a gateway, a router, a switch, or the like interposed (logically or physically) between the endpoint 1004 and the network 1012. In general, the credentials 1001 will have no legitimate use, and only serve to advertise unauthorized access to the credential store 1002. In the event that the endpoint 1004 becomes compromised and a login attempt is made to the trapping service 1014 or the remote web service 1010, use of the credentials 1001 will provide an indication of compromise to the endpoint 1004 and any suitable remediation may be taken. An example of a method for baiting endpoints in this manner is now described in greater detail.

Figure 11:
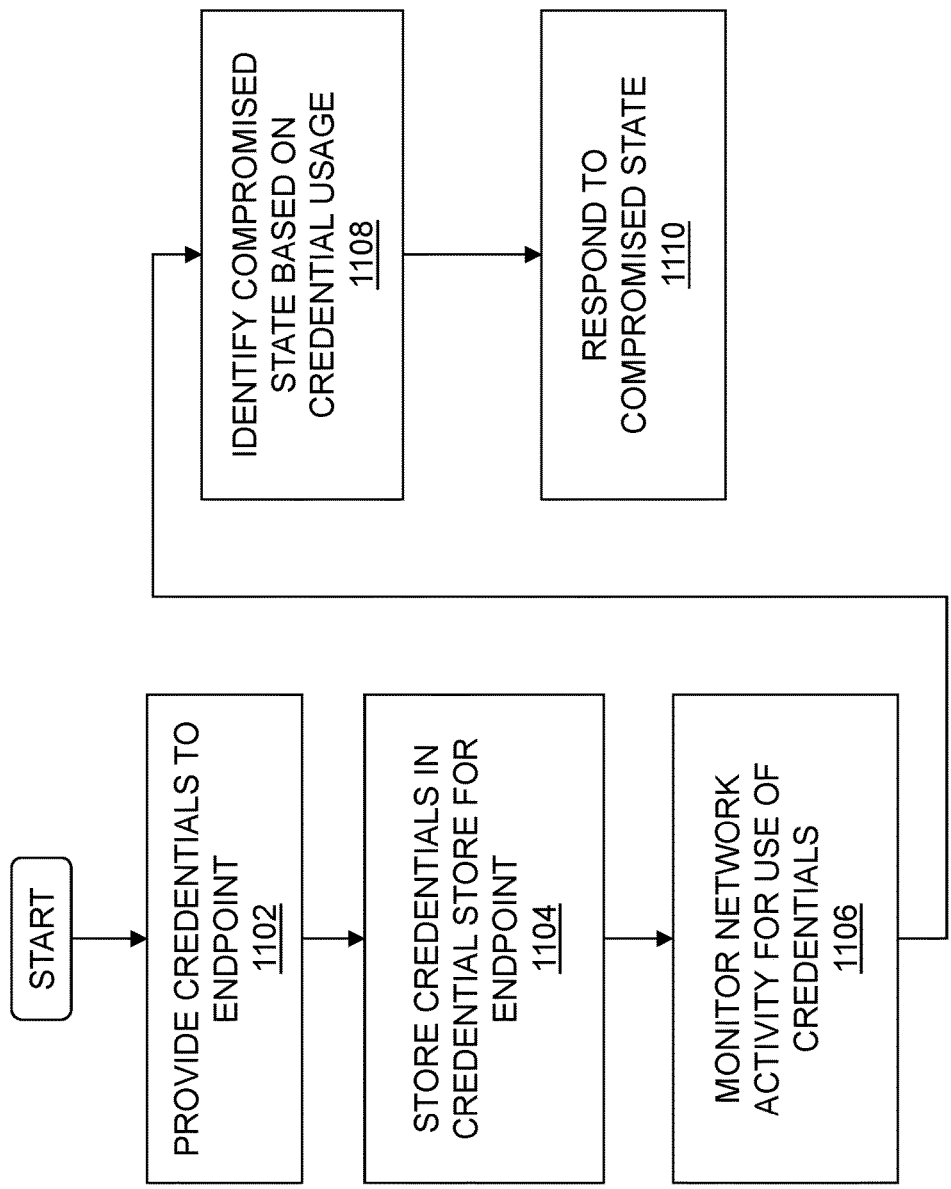
FIG. 11 shows a method for baiting endpoints to improve detection of authentication attacks.

FIG. 11 shows a method for baiting endpoints to improve detection of authentication attacks.

As shown in step 1102, the method 1100 may begin with providing credentials to the endpoint. This may, for example, include creating new credentials for the endpoint, and communicating the credentials to the endpoint over a network. The credentials may advantageously be selected to be attractive to malware, e.g., by including an account name (e.g., super_user or admin), a set of privileges (e.g., any elevated or complete file access and execution privileges), or a domain (e.g., accounting, legal, confidential, and the like) that might draw heightened interest to a malicious actor, whether automated or human. More generally, these elements of the credential set may be selected to include any characteristics that provide an appearance of access to valuable information.

This may be initiated from a service that is responsive to registration and/or login requests through the network. For example, the service may be a dedicated malware trapping service. This may also or instead include a remote service accessible with a browser executing on the endpoint, or any other third party service outside an enterprise network for the endpoint that is configured to identify authentication attacks by trapping malware that presents predetermined credentials improperly obtained from a credential store. In one aspect, the service may execute on a firewall for an enterprise network for the endpoint. In another aspect, the service may execute on a router, gateway, or other network device for the enterprise network.

In one aspect, the service may be a web service located at a remote network location from the endpoint and/or an enterprise network of the endpoint, e.g., at a location across an enterprise firewall. The web service may be created and hosted by the enterprise as a dedicated service for baiting endpoints as contemplated herein. In another aspect, the web service may be a commercial web service of a third party that, by agreement with the enterprise, provides a collection of credentials expressly for detecting compromised endpoints in the enterprise network. In this latter aspect, the third party may provide corresponding credential sets as requested by the enterprise, and the third party may optionally charge the enterprise for the credentials used to provide this improved security feature, as well as for the downstream monitoring of credential usage.

In another aspect as noted above, the firewall may host a dedicated trapping service at a network address within the enterprise network (or more specifically, hosted at the firewall) with a sole purpose of trapping usage of the faked credentials. Thus, in one aspect, providing the credentials may include providing credentials to an endpoint for logging in to a dedicated malware trapping service accessible by the endpoint through a network, such as a dedicated malware trapping service on the firewall or at a remote network location.

As shown in step 1104, the method 1100 may include storing the credentials in a memory for use by an endpoint to log in to a service available to the endpoint on a network. This may, for example, include storing the credentials in a credential store or other secure credential storage facility for the endpoint. Where the credential store is directly accessible by a process on the endpoint, the credentials may simply be placed in the credential store, along with the network address of the corresponding service, e.g., in any format and with any encoding appropriate for the credential store. However, credential stores are often proprietary and/or heavily encrypted to protect sensitive login information available therein, and may rely on third party services, security tokens, encryption keys, and other information or resources to obtain and present login credentials to a remote service. Thus, even where an operating system or a local application such as a web browser maintains a credential store locally on the endpoint, it may not be possible to directly read from and write to this credential store. In order to place faked credentials into such a data store, a process on the endpoint (or a remote process) may cause the endpoint to log in to or register at the corresponding service so that the corresponding credential data can be natively added to the credential store. Thus, in one aspect, storing the credential on the endpoint includes causing the endpoint to add the credentials to a credential store for the endpoint by logging in to the service using the credentials.

It should also be understood that, while the credential store may be a local credential store residing in a memory on the endpoint, the credential store may also or instead include a remote credential store residing in a memory remote from the endpoint and accessible by the endpoint through the network. This latter implementation may, for example, include various cloud-based services, identity management services, and the like that remotely store credentials and identity information for use by the endpoint in network environments. In another aspect, the credential store may include browser cookies or other browser information stored on the endpoint that is specific to particular websites.

As shown in step 1106, the method 1100 may include monitoring network activity by the endpoint to detect use of the credentials. This may for example, include monitoring login attempts at a dedicated malware trapping service as described herein, or monitoring login attempts a remote web service or the like. This may also or instead include monitoring access to the service to detect presentation of the credentials to the service by a device other than the endpoint, and identifying the device as a compromised device. Thus, for example, where the credential store itself is exported or otherwise made accessible to a second device, this information may be used to detect the source of the credentials request as also compromised. In one aspect, all devices may be seeded with the same credentials in order to simplify detection rules. In another aspect, the devices may each be seeded with different credentials in order to provide more granular detection of the location of a compromise.

As shown in step 1108, the method 1100 may include identifying a compromised state of the endpoint based on credential usage. For example, the method 1100 may include identifying a compromised state of the endpoint when a use of the credentials is detected at a dedicated malware trapping service, or more generally, when a use of the credentials is detected anywhere, e.g., when the credentials are presented to a remote service, or when the credentials are communicated through a firewall filter or the like that is instrumented to detect the credentials.

As shown in step 1110, the method 1100 may include responding to the compromised state. This step 1110 contemplates any of a wide range of possible response and combinations of responses generally encompassing remediation of the endpoint and downstream tracking of the malicious behavior. For example, this may include responding to the compromised state by terminating network access by the endpoint. In another aspect, this may include responding to the compromised state by initiating remediation of the endpoint, for example using any of the remediation techniques described herein such as malware removal, withholding decryption keys for data on the endpoint, ending a user session, requiring re-verification of user credentials or other stepped-up verification procedures, and so forth. In an aspect, remediation may also or instead include one or more of revoking other credentials contained in the credential store, or notifying relevant credentialing authorities of the compromise. Responding may also or instead include further baiting of the endpoint, e.g., by creating attractive but falsified information on the endpoint (e.g., financial information, personal information, bank account information, and the like) to retain interest in the endpoint so that further monitoring and analysis can be performed, or by deploying tracking software or planting an exploit or other countermeasure in data that is provided by the service in response to access using the credentials. In another aspect, the response may include identifying a process on the endpoint that used the credentials, and tracking activity of the process to identify further malware activity by the process. After the compromised state has been resolved, the process may optionally return to step 1102 where new credentials can be provided to the endpoint for placement in the endpoint credential store.

In one aspect, there is disclosed herein a device for baiting endpoints for improved detection of authentication attacks. The device may include a network interface configured to couple in a communicating relationship with a network including an endpoint, along with a memory and a processor. The processor may be configured by computer executable code stored in the memory to perform the steps of storing credentials in a memory for use by the endpoint to log in to a service available to the endpoint on the network, monitoring activity of at least one of the endpoint and the service to detect use of the credentials, and when a use of the credentials at the service is detected, identifying a compromised state of the endpoint.

Figure 12:
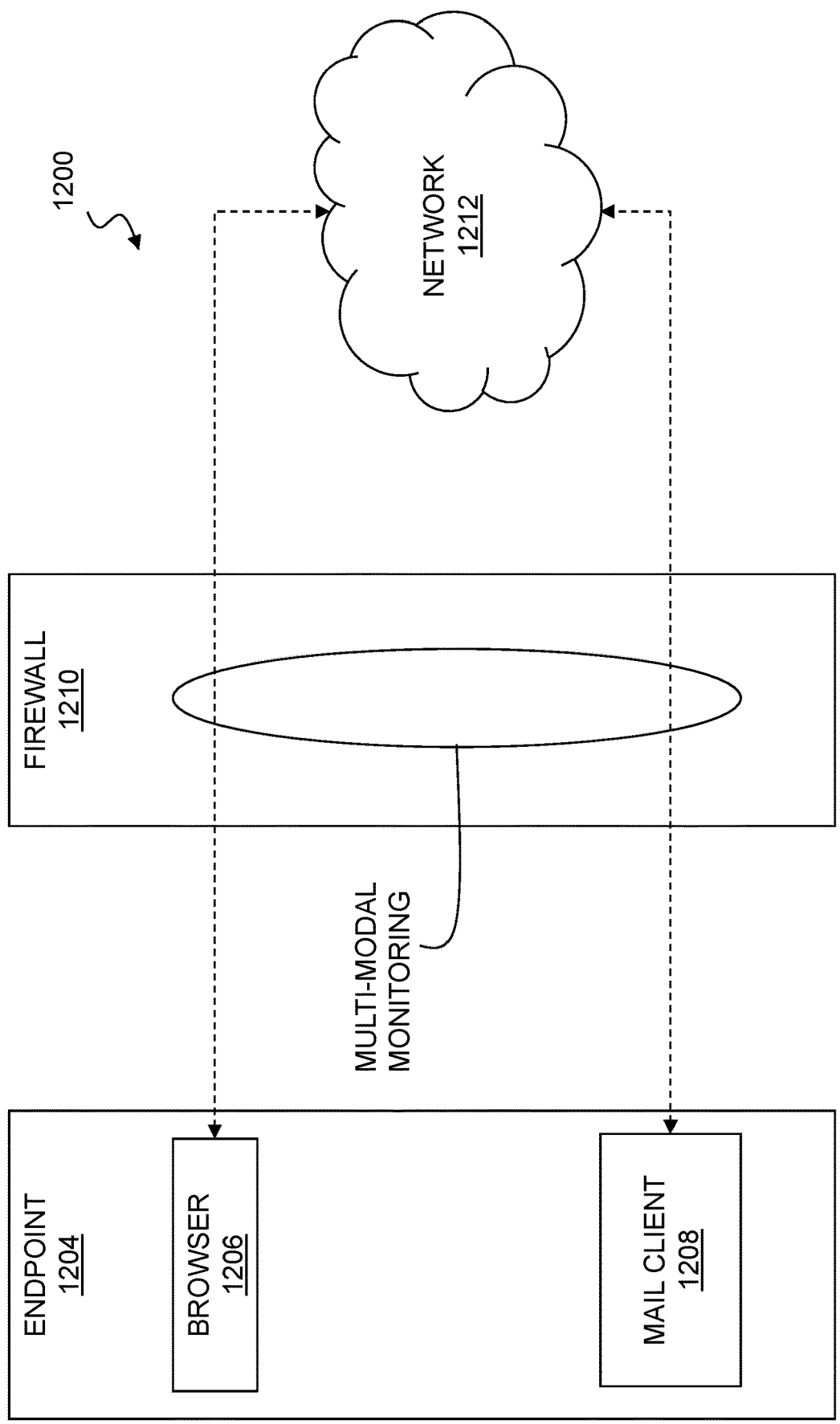
FIG. 12 shows a multi-modal monitoring system for improved detection of phishing attacks.

FIG. 12 shows a multi-modal monitoring system 1200 for improved detection of phishing attacks. In general, an endpoint 1204 may execute a browser 1206 for web navigation, and a mail client 1208 for sending and receiving electronic mail (typically in cooperation with a remote mail server or the like). Both of these local applications may communicate through a firewall 1210 or similar gateway for an enterprise network to which the endpoint 1204 belongs, and the endpoint 1204 may communicate through the firewall 1210 with a network 1212 that connects the endpoint 1204 with, e.g., the electronic mail server used by the mail client 1208 and web content used by the browser 1206. These two communication channels may use different network protocols, data formats, and the like, and are typically not concurrently monitored for inter-related communications. Even where an electronic mail is viewed through a web mail client within the browser 1206, the content of the electronic mail viewed therein may be treated separately from the underlying web traffic for the browser.

By using multi-model monitoring, a firewall 1210 or other network resource may identify relationships between web traffic and electronic mail traffic, or more specifically in the case of a phishing attack, the absence of a relationship between an electronic mail communication requesting sensitive information and any preceding web interactions that might have elicited such an electronic mail inquiry. An example of a method for exploiting this multi-modal monitoring is discussed in greater detail below. While a firewall 1210 is illustrated for this purpose, it will be appreciated that monitoring and other processes may be performed at the endpoint 1204, or at any other suitable location or combination of locations.

Figure 13:
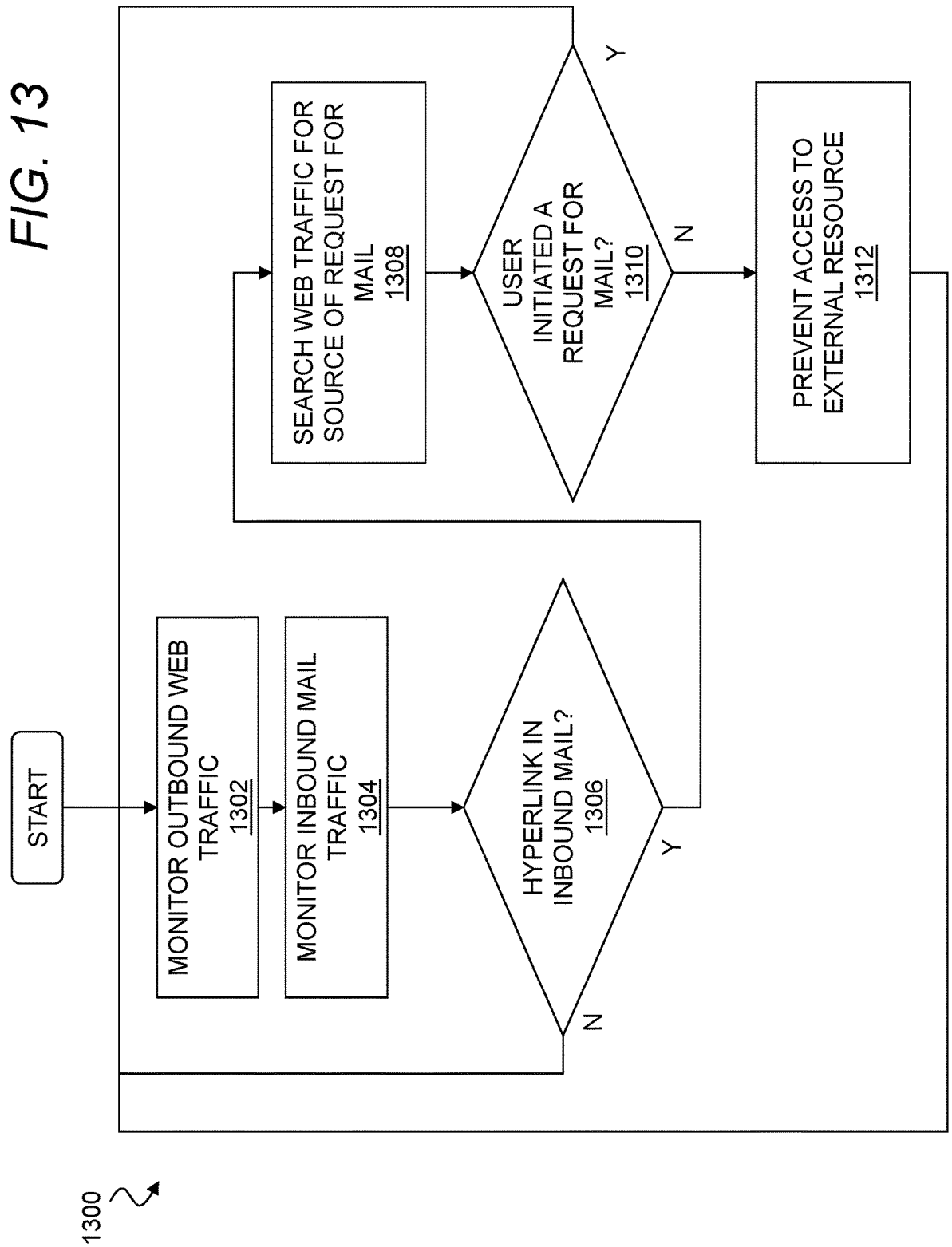
FIG. 13 shows a method for improved detection and prevention of phishing attacks.

FIG. 13 shows a method for improved detection and prevention of phishing attacks.

As shown in step 1302, the method 1300 may begin with monitoring outbound web traffic from an endpoint, such as by monitoring activity by a web browser executing on the endpoint. The endpoint may be associated with an enterprise or network that provides corporate credentials for corporate users, and the monitoring may include monitoring of the use of credentials at remote websites. Monitoring outbound web traffic may include locally monitoring network communications at the endpoint or remotely monitoring network communications at a firewall coupled between the endpoint and a network. A security policy for the enterprise may provide additional restrictions on web traffic during monitoring, either independently from and/or in addition to monitoring for use of credentials. For example, monitoring outbound web traffic may include restricting outbound web traffic according to the security policy, such as by prohibiting web access to certain domains or websites.

As shown in step 1304, the method 1300 may include monitoring the inbound electronic mail traffic to the endpoint. Monitoring the inbound electronic mail traffic may include locally monitoring network communications at the endpoint or remotely monitoring network communications at a firewall coupled between the endpoint and a network. Similarly, monitoring inbound electronic mail traffic may include monitoring activity by a local electronic mail client executing on the endpoint, or monitoring inbound electronic mail traffic may include monitoring activity within a web mail client displayed within a web browser executing on the endpoint, or some combination of these.

A variety of techniques may be usefully deployed to detect relevant electronic mail communications. In one aspect, monitoring inbound electronic mail traffic includes analyzing a displayed message within the electronic mail traffic for text indicating that the electronic mail is responsive to a user registration process. In another aspect, monitoring the inbound electronic mail traffic includes restricting the inbound electronic mail traffic according to a security policy for the enterprise or network.

It will be understood that while outbound and inbound monitoring are illustrated as discrete steps, these may be repeated with any frequency and in any order appropriate to a desired level of monitoring for and endpoint. For example, where real time monitoring is desired, both monitoring steps may be performed continuously and concurrently. Where batch monitoring is desired, e.g., where the method 1300 is only deployed when a link in an electronic mail is selected in a user interface, then logging may be continuous, but analysis may be deferred until a link selection is detected. More generally, any frequency and order of monitoring steps may be used provided that a desired sensitivity to current computer activity is achieved.

As shown in step 1306, if no hyperlink is located in a particular item of electronic mail, then the process 1300 may return to step 1302 where additional monitoring of web traffic and electronic mail traffic may be performed. When an electronic mail in the inbound electronic mail traffic includes a hyperlink to an external resource, the method 1300 may proceed to step 1308.

As shown in step 1308, when an electronic mail in the inbound electronic mail traffic includes a hyperlink to an external resource, the method 1300 may include searching the outbound web traffic from a user of the endpoint for one or more possible sources of a request for the electronic mail by the user. Searching the outbound web traffic may, for example, include searching for a correspondence between a URL of the hyperlink and a second URL of one of the remote web sites in the outbound web traffic. Where a correspondence is identified, an inference may be made that the user initiated the request for the electronic mail, and the mail may be further processed as discussed below. Similarly, where an inbound electronic mail appears related to a legitimate password reset, registration process, business communication, or the like, that can be associated with outbound web traffic, the electronic mail may be identified as a user initiated request.

As shown in step 1310, if the user initiated the request for the electronic mail containing the hyperlink, then no remediation or other action may be required, and the method 1300 may return to step 1302 where additional web traffic and mail traffic monitoring may be performed. This may include allowing access to the external resource with the hyperlink in an ordinary, uninterrupted fashion. Where there is a security policy controlling use of corporate credentials outside the enterprise, other tests may be performed at this step. Thus, for example, the method 1300 may include locally preventing submission of one of the corporate credentials for the user to one of the remote web sites when one of the remote web sites has a low reputation. In one aspect, this latter rule may be enforced continuously and independently of electronic mail communications.

If the user did not initiate the request, e.g., where no link to corresponding web activity can be identified in historical logs, then the method 1300 may include preventing access to the external resource, e.g., subject to a security policy of the enterprise or network, as shown in step 1312. The security policy, may for example, permit use of the external resource when the external resource has a good reputation (e.g., a known software updater), and permit use of hyperlink to that resource even if there is no indication that the electronic mail was solicited by the user. In one aspect, preventing access may include notifying the user of an unsolicited electronic mail and requesting an explicit authorization from the user before permitting use of the hyperlink to access the external resource. However resolved, the method 1300 may, after completion, return to step 1302 where additional monitoring may be performed.

According to an implementation as per the foregoing, there is described herein a device for detecting and preventing phishing attacks. The device, which may be any of the endpoints, firewalls, or other computing devices described herein, may include a network interface configured to couple in a communicating relationship with a network, a memory, and a processor. The processor may be configured by computer executable code stored in the memory to perform the steps of monitoring outbound web traffic from an endpoint including use of credentials at remote web sites, where the endpoint is associated with an enterprise that provides corporate credentials for corporate users, monitoring inbound electronic mail traffic to the endpoint, when an electronic mail in the inbound electronic mail traffic includes a hyperlink to an external resource, determining whether a user of the endpoint initiated a request for the electronic mail by searching the outbound web traffic from the user of the endpoint for one or more possible sources of the request, and conditionally allowing access to the external resource with the hyperlink based on whether the user initiated the request.

In one aspect, the processor may be further configured to conditionally allow access to the external resource based on a security policy of the enterprise or network for accessing external resources. The device may include the endpoint (e.g., where local monitoring is performed), or the device may include a firewall, gateway, or similar network device between the endpoint and the network.

Figure 14:
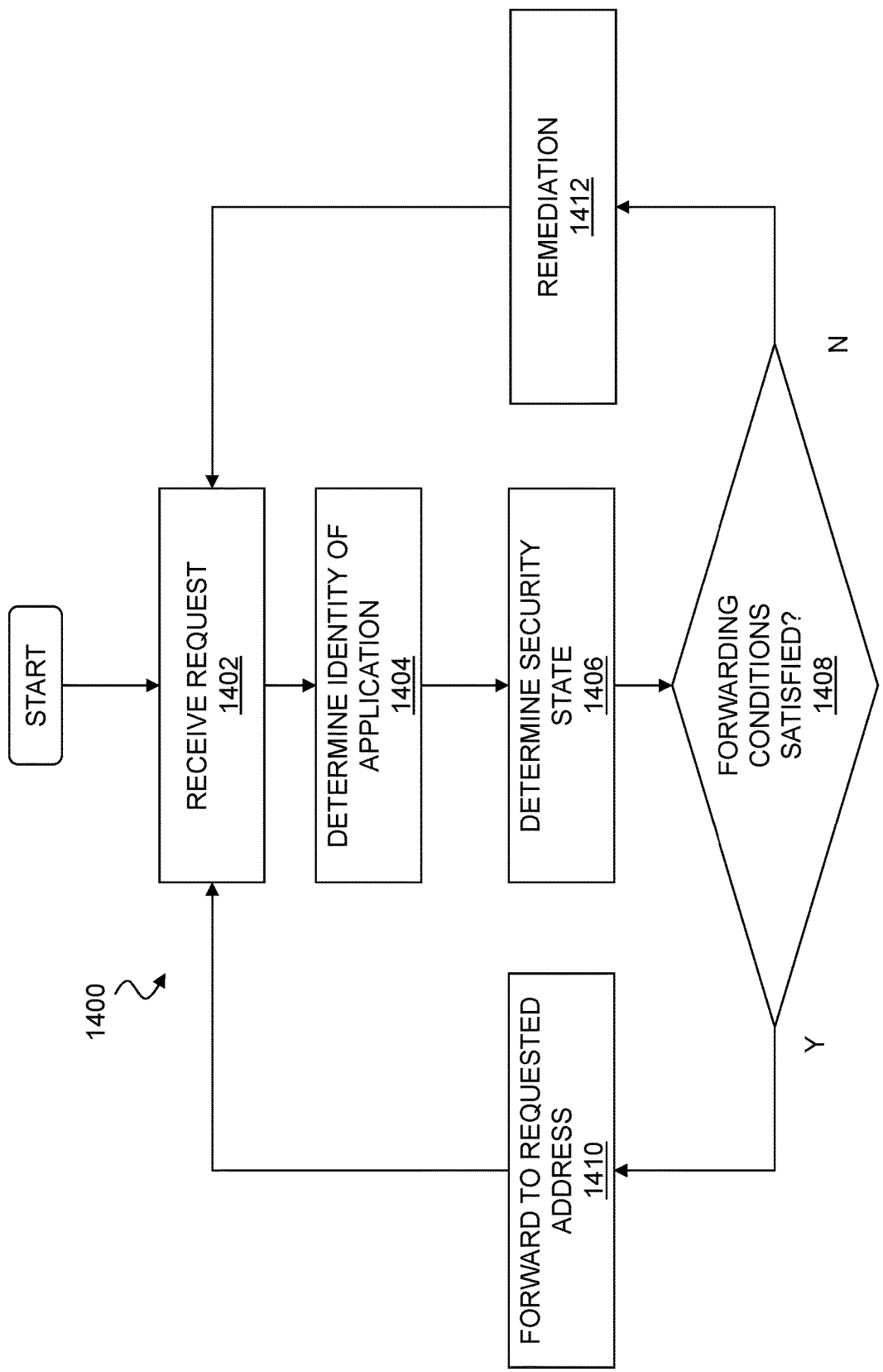
FIG. 14 shows a method for handling network traffic based on the identity of a source application for the traffic.

FIG. 14 shows a method for handling network traffic based on the identity of a source application for the traffic. More specifically, the flow chart of FIG. 14 illustrates a method for operating a firewall or similar network device to selectively forward network communications between a first network interface and a second network interface (which may be the same interface or different interfaces). In general, the first interface may be operable to couple to an endpoint that is executing an application, and the second interface may be operable to couple to a remote resource hosted on a server or the like. The techniques disclosed herein for coloring network flows may be used to signal, either within packets of network data or in a separate control channel, the identity of an application on an endpoint that is originating network traffic, or engaged in network communications with a remote resource or the like. This information may be used to make improved decisions about whether and how to route traffic to and from the identified application. By using this information as described below, network traffic may be conditionally forward only when certain security conditions are met.

As shown in step 1402, the method 1400 may include receiving a request from an application executing on an endpoint. This may be any application sourcing network traffic such as a web browser, a messaging client, or some other application. It will be understood that the request may contain information that, at least initially, can provide an indicia of non-malicious network activity. For example, the request may include credentials for authenticating an application to the server hosting a remote resource, or the request may include an encrypted heartbeat containing (verifiable) information about a state of the endpoint.

As shown in step 1404, the method 1400 may include determining an identity of an application that originated a request on an endpoint, for example based on an application identity contained in a packet carrying the request. Thus for example the identity of the application may be extracted from the request and, where suitable digital signatures are included, verified or otherwise tested for authenticity as desired. In another aspect, determining the identity of the application may include querying the endpoint from a firewall or the like for the identity (assuming the corresponding capabilities are available on the endpoint to respond to such a query).

As shown in step 1406, the method 1400 may include determining a security state of the application. This may be performed using any of the malware detection techniques contemplated herein. In one aspect, determining the security state of the application may include determining the security state based on a secure heartbeat included in the packet. For example, the secure heartbeat may directly encode security (or compromise) information that can be used to assess the security of the application, and the security state of the application may be extracted from the request. In another aspect, a presence or absence of the secure heartbeat may be used to infer a health state of the application based on a more general health state of the endpoint.

In another aspect, where the endpoint is instrumented (e.g., with a security data recorder or other similarly-capable logging facility) to detect causal chains of events on the endpoint, this information may be usefully employed to traverse a causal chain of events on the endpoint to identify a root cause of the request, which may also or instead be evaluated for possible compromise. Thus for example, where a generic and otherwise healthy application initiates a suspicious request, this may be reflected in a causal chain that suggests that the application has been compromised in some manner. This may also or instead include more generally querying the endpoint from a firewall or other network appliance for indicia of compromise, e.g., by requesting a secure heartbeat, requesting authentication data, requesting credentials, or any other technique for manual or automated verification of endpoint health.

Other techniques may also or instead be used such as credential-based authentication techniques or the like. For example, determining the security state of the application may include querying the endpoint for at least one of credentials authenticating the application to the server, credentials authenticating a user of the endpoint to the server, or an encrypted heartbeat containing information about a state of the endpoint.

As shown in step 1408, the method 1400 may include conditionally forwarding the request to the server as requested only when certain security conditions are satisfied. By way of non-limiting example, this may include conditionally forwarding the request when the identity of the application is recognized and the security state of the application is uncompromised. This may also or instead include conditionally forwarding the request only when the security state of the endpoint is uncompromised. It will be understood that, while forwarding criteria may be manually provided, rules for forwarding may also or instead be automatically generated based on crowd-sourced behavior, pattern detection, and so forth. Thus for example a rule may be created by monitoring a pattern of traffic to the remote resource from a plurality of endpoints and automatically developing a rule for acceptable connections to the server based on the pattern of traffic.

In general, if the forwarding conditions are satisfied, the method 1400 may proceed to forward the request to the intended recipient (the server) as requested (step 1410) and the method 1400 may return to step 1402 where a next request may be received from the endpoint.

As shown in step 1412, if the forwarding conditions are not satisfied, then additional remediation may be performed. For example, the method 1400 may include transmitting a notification to the endpoint, or to a threat management facility or other network security resource, when an indication of compromise is detected for the application.

Following a satisfactory remediation, the method 1400 may return to step 1402 where a next request may be received from the endpoint.

According to the foregoing, in one aspect there is disclosed herein a firewall configured to selectively forward network communications. The firewall may include a first network interface operable to couple to an endpoint and a second network interface operable to couple to a remote resource hosted at a server. The firewall may include a processor configured to respond to a request from the endpoint to the remote resource for a service by performing the steps of: determining an identity of an application that originated the request on the endpoint, determining a security a security state of the application, and conditionally forwarding the request to the server only when the identity of the application is recognized and the security state of the application is uncompromised, all as generally described above.

In one aspect, the firewall may be locally coupled to the remote resource, e.g., so that the resource can monitor for requests from compromised endpoints, or the firewall may be locally coupled to the endpoint, e.g. resident on the endpoint. The firewall may also or instead be a firewall of an enterprise gateway or the like that monitors traffic between an enterprise network and a public network, or any other gateway or the like between different networks. In another aspect, the endpoint and the remote resource may be coupled together through a peer-to-peer network or other network infrastructure.

In another aspect, there is disclosed herein a computer program product for operating a firewall to selectively forward network communications between a first network interface of the firewall operable to couple to an endpoint and a second network interface of the firewall operable to couple to a remote resource hosted at a server. The computer program product may include computer executable code embodied in a non-transitory memory of a firewall or the like that, when executing on the firewall, responds to a request from the endpoint to the remote resource by performing any of the steps described above.

Figure 15:
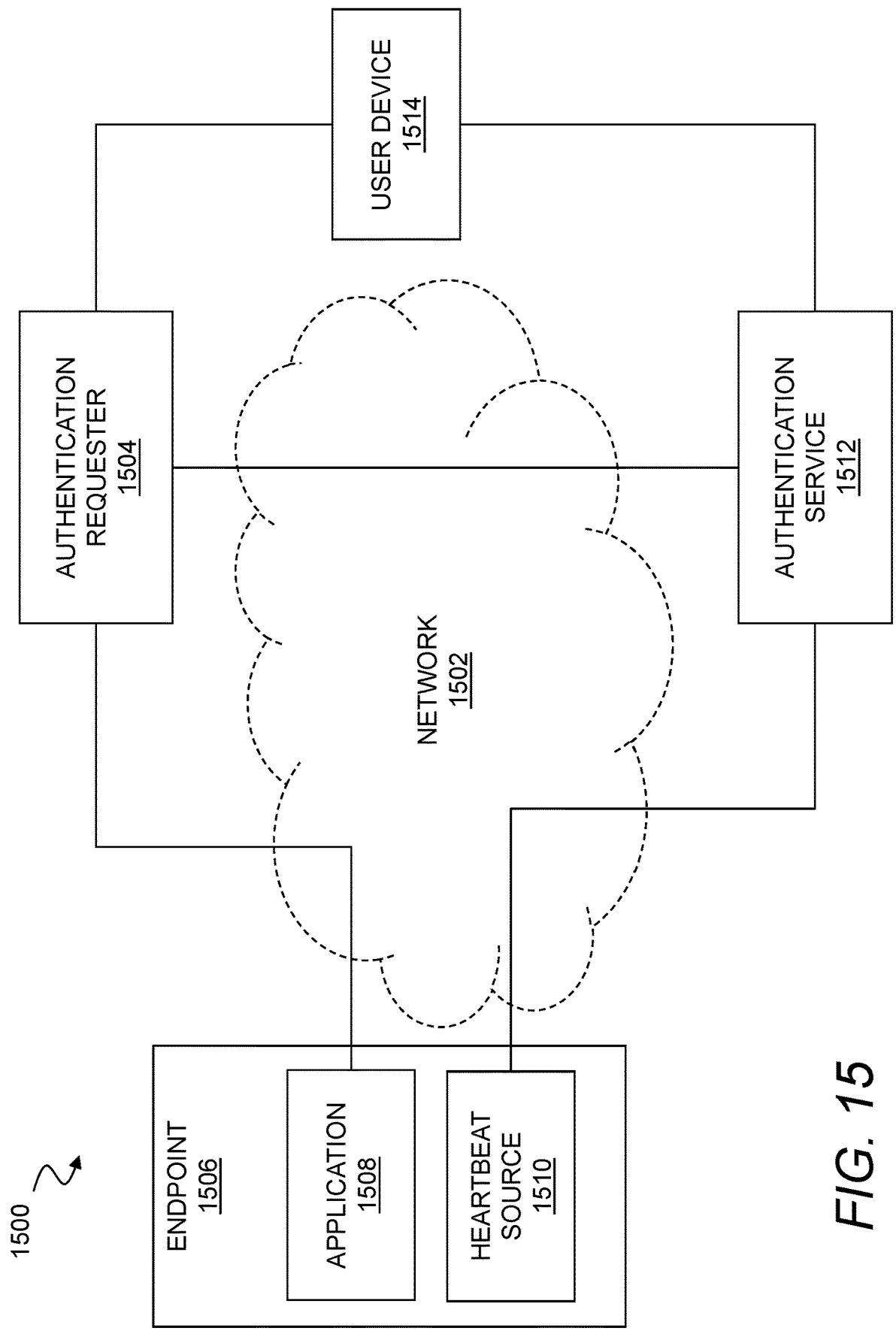
FIG. 15 shows a system for multi-factor authentication using an endpoint heartbeat.

FIG. 15 shows a system for multi-factor authentication using an endpoint heartbeat. In general, multi-factor authentication contemplates verification of the identity of a user based on various authentication factors such as something the user knows (e.g., a password), something the user has (e.g., a hardware token or smart phone), or something the user is (e.g., a biometric characteristic such as a fingerprint, voice print, typing speed or pattern, etc.). A secure heartbeat from an endpoint may be used instead of or in addition to any one of these authentication factors to enable multi-factor authentication based on a health state of the endpoint. In general, the system 1500 may include a network 1502 such as any of the networks described herein, along with an authentication requester 1504, an endpoint 1506, an authentication service 1512 and a user device 1514. An application 1508 may be executing on the endpoint 1506, as well as a heartbeat source 1510 that provides heartbeat indicating the health status of the endpoint 1506. In a conventional model, the endpoint 1506 may provide user credentials and receive a token or other authentication data or the like from an active directory federation service or similar platform for an enterprise, and provide this token to a cloud-based access control service. The access control service may, in turn verify the token with the provider and issue a second token that the endpoint 1506 can use to access secure services protected by the access control service. These techniques may be adapted for use with heartbeat-based authentication in a variety of ways.

The authentication requester 1504 may be any network entity, program or the like that might seek to verify the identity of the endpoint 1506, or a user of the endpoint 1506. This may, for example, include any cloud-based service, secure server, or other platform that provides resources, e.g., through the network 1502, to properly authenticated users. When an endpoint 1506 initiates a request for access to such resources, the authentication requester 1504 may require authentication data from the endpoint 1506.

In another aspect, the authentication requester 1504 may be the endpoint 1506. That is, the endpoint 1506 may provide a heartbeat to the authentication service 1512 and receive authentication data such as a token, one-time code, or the like in response. The endpoint 1506 may then present this authentication data to other resources as needed. For example, the endpoint 1506 may provide a heartbeat to a local or remote identity management system in order to receive authentication data including an identity-based token. In another aspect, the endpoint 1506 may provide a heartbeat to an access control service in addition to or instead of an identity-based token, and receive authentication data enabling the endpoint 1506 to access remote services.

In another aspect, the authentication requester 1504 may be a gateway, access control service, or other connector to secure services. This may, for example, included a local authentication system such as an active directory service, or an enterprise access control platform or identity management system. This may also or instead include any cloud-based resource such as a cloud-based computing platform, social networking platform, or the like. In such embodiments, the request for authentication data from the authentication requester 1504 may be an explicit request presented to the endpoint 1506 or the authentication service 1512, or the request may be an implicit request. In an implicit request, the endpoint 1506 may be required to present authentication data through an application programming interface or the like as a part of an authentication process. That is, a request is not explicitly presented to the endpoint 1506, but the authentication data must nonetheless be presented (optionally along with other information) in order to proceed, and is thus requested in the sense that it is affirmatively required in order to proceed with an authentication process. Thus in one aspect, requesting authentication data as contemplated herein includes presenting a programming interface or the like that conditions access or use on the receipt of proper authentication data. In complementary fashion, receiving an authentication request may include accessing the application programming interface and providing authentication data through the programming interface. For example, the authentication requester 1504 may include a cloud-based or enterprise identity management service that requires credentials or the like as a condition for issuing a token associated with an identity of the credential provider. In such systems, the heartbeat may be used in addition to or instead of user credentials.

In another aspect, the authentication requester 1504 may be a web service or the like that is directly accessed by the endpoint 1506. This may, for example, include a website, server, or other resource or service that a user of the endpoint 1506 might log into or otherwise access or use. In this context, an authentication request may be associated with a login page or the like, or the authentication request may be associated with a particular transaction such as a funds transfer, file download, or the like.

In general, the application 1508 may be any program or service executing on the endpoint 1506 that might attempt to demonstrate an identity of the endpoint 1506 or a user of the endpoint, e.g., in order to access secure services or otherwise interact with an identity management layer of a local, enterprise, and/or cloud-based infrastructure. For example, the application 1508 may include a browser attempting to establish a trust relationship for use of a secure web service. The heartbeat source 1510 may include any of the sources of a heartbeat described herein. In one aspect, the content of the heartbeat may vary according to a state of health or compromise for the endpoint 1506, so that the authentication service 1512 can make decisions or perform authentication functions conditionally according to the health state of the endpoint 1506.

The authentication service 1512 may in general be any service accessible by the endpoint 1506 and configured to provide authentication data conditioned upon receipt of a heartbeat from the endpoint 1506. The authentication service 1512 may, for example, execute within a gateway, firewall, threat management facility or other facility within an enterprise for the endpoint 1506, or at any other suitable logical or physical location within the identity management fabric of the enterprise. The authentication service 1512 may also or instead be a third-party service accessible through the network 1502. In one aspect, the authentication service 1512 may maintain a trust relationship with a potential authentication requester 1504 so that the authentication requester 1504 can either receive authentication data from the authentication server 1512 (for comparison to authentication data received through another channel), or cryptographically verify authentication data with reference to a trusted third party.

In general, the authentication service 1512 may rely on a heartbeat from the endpoint 1506 as a condition for release of authentication data. In one aspect, the authentication service 1512 may receive the heartbeat directly, e.g., within a communication from the endpoint 1506 to an application programming interface for the authentication service 1512, or in some other manner. For example, the heartbeat source 1510 may continuously provide a heartbeat to the authentication service 1512, and the authentication service 1512 may respond to authentication requests directly from another authentication requester 1504 based on the presence and content of the heartbeat. In another aspect, the authentication service 1512 may receive the heartbeat indirectly. For example, the heartbeat may be received by a threat management facility, gateway or other resource within an enterprise network, which may in turn make the heartbeat available to the authentication service 1512. In another aspect, this intermediate resource may provide information about the status of the endpoint 1506 based on the heartbeat, thus providing an indirect confirmation of the health status without requiring communication of the heartbeat itself. Thus for example a threat management facility may receive a heartbeat, verify a satisfactory health status of the endpoint, and then provide a corresponding indication of the health status in any suitable form and through any suitable communication channel to the authentication service 1512.

The authentication data provided by the authentication service 1512 may take a variety of forms. For example, the authentication data may include a token uniquely created for a transaction, which may include any suitable data in structured or unstructured form. For example, the authentication data may include a random or pseudo-random data string. The authentication data may also or instead include encrypted data or digitally signed data where downstream verification might usefully be performed with reference to a trusted third party. The authentication data may also or instead include information about the heartbeat or the identity of the user of the endpoint. In one aspect, the authentication data may contain an indication from the authentication service 1512 that the health status is satisfactory, which may be encrypted for secure communication and/or digitally signed for verification.

The authentication data may be communicated through a variety of communication channels. For example, the authentication data may be returned directly to the authentication requester 1504 in either plaintext or encrypted form. The authentication data may also or instead be returned to the endpoint 1506 for use as a token in a subsequent authentication process. In another aspect, the authentication data may be transmitted to the user in an electronic mail, text message or the like for use as a manual input to an authentication process. Such a communication may be returned to the endpoint 1506 for manual use from that location, or the communication may be forward to a user device 1514 such as a smart phone, pager, hardware token or other device associated with the user, thus providing a further authentication factor for the authentication process.

Other techniques may also or instead be employed by the authentication service 1512 to communicate a satisfactory condition of the endpoint, or to provide additional authentication factors in a multi-factor authentication process. For example, if the heartbeat indicates a satisfactory health state, a call may be placed to the user's smart phone providing them with a spoken version of a short, one-time code that can be manually entered elsewhere, or asking the user to verify that a heartbeat-based identity authentication has been authorized. A verification code may also or instead be sent to an application executing on a mobile device, or a verification request may be sent to the application.

Figure 16:
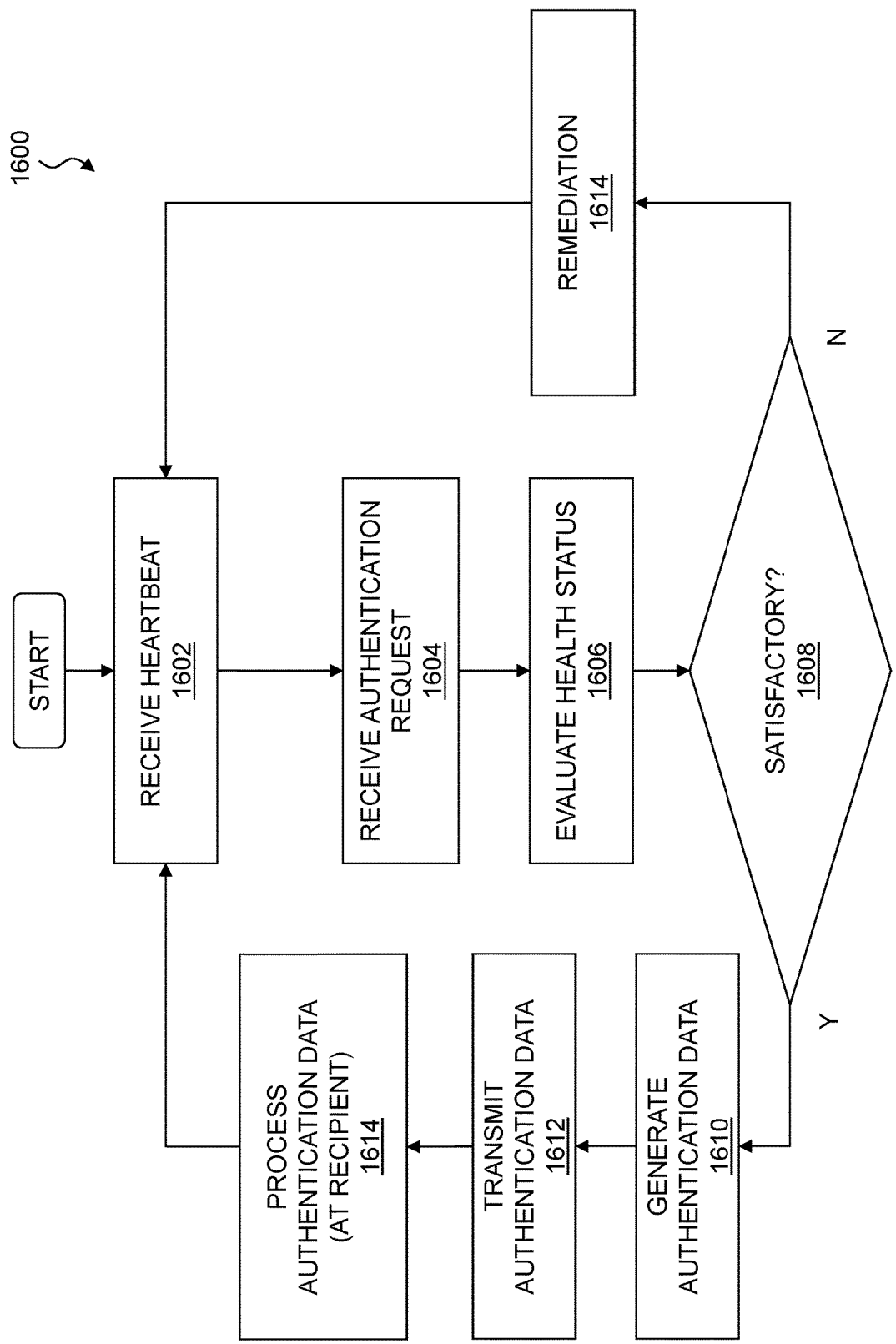
FIG. 16 shows a method for multi-factor authentication using an endpoint heartbeat.

FIG. 16 shows a method for multi-factor authentication using an endpoint heartbeat. More particularly, the method 1600 described below includes a method for operating an authentication service that supports multi-factor authentication using a heartbeat.

As shown in step 1602, the method 1600 may include receiving a heartbeat. This may include receiving a periodic heartbeat reported at some scheduled intervals by the endpoint, or this may include receiving the heartbeat in response to an explicit request for a heartbeat from an authentication service or other requester. In general, the heartbeat may be cryptographically secure, e.g., to permit verification of a source of the heartbeat with reference to a trusted third party. For example, the content of the heartbeat may be encrypted, or the heartbeat may be cryptographically signed. While this is illustrated as the first step in a process, it will be appreciated that the heartbeat may also or instead be received in response to or otherwise following an authentication request as contemplated below. Thus in one example embodiment an authentication request may be made, and then a heartbeat may be requested by an authentication service so that the health state of the endpoint can be confirmed before providing authentication data.

As shown in step 1604, the method 1600 may include receiving an authentication request for authentication data for the endpoint. The request may be received from the endpoint, or from some other entity or device such as a hardware token associated with a user of the endpoint or some other computing device other than the endpoint. For example, receiving the authentication request may include receiving a request from the endpoint for a token suitable for authenticating a user of the endpoint to a secure service that is accessible by the endpoint through a data network. As noted above, the authentication data may generally include a token or other data, identifier, or the like that can be used by the endpoint to authenticate to other resources, or alternatively, used by any such other resources when an endpoint attempts to authenticate.

The request may be received at any of a number of network locations or resources that might participate in a heartbeat-based multi-factor authentication system as contemplated herein. For example, receiving the request for authentication data may include receiving the request at one or more of a cloud service, a firewall or a gateway. The recipient may also receive the heartbeat, or the request may be forwarded to a separate authentication service or other resource that can use the request in combination with the heartbeat information to make an appropriate authentication decision and take corresponding action.

As shown in step 1606, the method 1600 may include evaluating a health status of the endpoint. This may be based on the presence and/or content of the heartbeat, along with any other context or useful information. As contemplated herein, the heartbeat may directly encode an explicit health status, or the heartbeat may contain information from which a health status can be inferred. The health status may be "compromised" or "unsatisfactory," for example, when the endpoint contains malware, has exposure to unknown content, or is otherwise in an actual or potential state of compromise. As described herein, the health status may be reported at various levels of granularity. For example, the health status may include a health status of one or more files on the endpoint or a process executing on the endpoint. The health status may also or instead be for the endpoint overall, or for a particular user (e.g. an account) of the endpoint.

As shown in step 1608, a determination may be made whether the health status is satisfactory. If the health status is not satisfactory, the method 1600 may proceed to step 1614 where any suitable remediation may be performed. This may include withholding authentication data, or generating a defective token or other bogus authentication data that can signal a compromised health status to recipients. This may also or instead include notifying a threat management facility or other individual or resource of the state of the endpoint so that appropriate remedial action can be undertaken. After any remediation is completed, the method 1600 may return to step 1602 where another heartbeat may be received, e.g. for the same endpoint or for a different endpoint in an enterprise network.

As shown in step 1610, if the health status is satisfactory (as determined in step 1608), the method 1600 may include generating authentication data such as any of the authentication data described above. For example, this may include generating a token for use by the endpoint when authenticating to other resources. This may also include encrypting the authentication data, digitally signing the authentication data, or otherwise processing the authentication data for downstream use.

As shown in step 1612, the method 1600 may include transmitting the authentication data to a recipient in response to the request. This may, for example include returning a token to the endpoint or otherwise directly providing the authentication data to a requester. This may also or instead include indirectly providing authentication data by communicating the authentication data to a resource other than the requester. In an embodiment, transmitting the authentication data may include transmitting a token to an endpoint, and transmitting information for verifying the token to an access control system used by the endpoint to access a secure service. The access control system can then use this information to authenticate the endpoint when the endpoint presents the token. The information for verifying the token may include a copy of the token, or other cryptographic information such as a key, a hash, or the like, that might usefully be employed to verify the source and authenticity of the token.

The recipient of the authentication data may include the endpoint, which may receive the token directly, or the recipient may include a mobile device or other computing device. Thus for example, transmitting the authentication data may include transmitting a text message to a mobile device of a user of the endpoint or an electronic mail message to an electronic mail account of the user of the endpoint. By way of non-limiting example, the authentication data may include a one-time code transmitted to a smart phone of the user for manual entry into a user interface of the endpoint. More generally, the authentication data may be created and shared in a number of manners.

As shown in step 1614, the method 1600 may include processing the authentication data at a recipient. For example, where the recipient is an endpoint and the authentication data is a token, the endpoint may present the token to an access control system for access to remote resources. The recipient may also or instead include an access control system or the like, and the method 1600 may include locally comparing the authentication data received from the endpoint to an expected response, which may be evaluated by retrieving the token or a proxy for the token from the authentication service, or by decrypting or otherwise processing the token received from the endpoint.

According to the foregoing, a multi-factor authentication system based on heartbeat may be deployed on any suitable security appliance such as a cloud service for supporting multi-factor authentication or a gateway for an enterprise network. The security appliance may include a network interface configured to couple the security appliance in a communicating relationship with a data network; a memory; and a processor configured by computer code stored in the memory to perform the steps of receiving a heartbeat from an endpoint that is cryptographically secured through the network interface, receiving a request for authentication data for the endpoint through the network interface, evaluating a health status of the endpoint based on the heartbeat, generating authentication data if the health status of the endpoint is satisfactory, and transmitting the authentication data to a recipient in response to the request.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for preventing phishing attacks, the computer program product comprising computer executable code embodied in a non-transitory computer readable medium that, when executing on one or more computing devices, causes the one or more computing devices to perform:
    monitoring, with a local security agent executing on an endpoint, outbound web traffic originating from a web browser executing on the endpoint, wherein:
        the endpoint is coupled in a communicating relationship with a threat management facility, the endpoint is associated with an enterprise network managed by the threat management facility, the endpoint further associated with a user of the enterprise network, and the local security agent is configured to communicate information about the outbound web traffic to the threat management facility;

monitoring, with the threat management facility, inbound electronic mail traffic addressed to the user of the endpoint;

in response to a hyperlink to an external resource detected in an electronic mail in the inbound electronic mail traffic addressed to the user, performing a search of the outbound web traffic originating from the web browser before receipt of the electronic mail for one or more possible sources of a request for the electronic mail by the user; and in response to the search failing to identify the one or more possible sources of the request for the electronic mail by the user in the outbound web traffic from the web browser, restricting, with the local security agent, access from the endpoint, via the hyperlink in the electronic mail, to the external resource.

2. The computer program product of claim 1, further comprising code that causes the one or more computing devices to perform, in response to the search identifying the one or more possible sources of the request for the electronic mail by the user in the outbound web traffic, allowing access to the external resource from the endpoint via the hyperlink in the electronic mail.

3. The computer program product of claim 1, wherein the outbound web traffic includes a user registration process associated with the electronic mail.

4. A method for preventing phishing attacks comprising:
monitoring outbound web traffic originating from a web browser executing on an endpoint;

monitoring inbound electronic mail traffic addressed to a user associated with the endpoint;

in response to a hyperlink to an external resource detected in an electronic mail in the inbound electronic mail traffic addressed to the user, performing a search of the outbound web traffic originating from the web browser before receipt of the electronic mail for one or more possible sources of a request for the electronic mail by the user; and in response to the search failing to identify the one or more possible sources of the request for the electronic mail by the user in the outbound web traffic from the web browser, restricting access from the endpoint, via the hyperlink in the electronic mail, to the external resource.

5. The method of claim 4, wherein monitoring outbound web traffic includes monitoring outbound web traffic with at least one of a local security agent executing on the endpoint and a threat management facility for an enterprise network.

6. The method of claim 4, wherein monitoring inbound electronic mail traffic includes monitoring inbound electronic mail traffic with at least one of a local security agent executing on the endpoint and a threat management facility for an enterprise network.

7. The method of claim 4, wherein restricting access to the external resource from the endpoint includes permitting access to the external resource according to a security policy of an enterprise network if the external resource has a known, good reputation.

8. The method of claim 4, wherein performing the search includes searching an historical log of outbound web traffic stored at a threat management facility for an enterprise network, and wherein performing the search includes searching for a correspondence between a URL of the hyperlink and a second URL of a remote web site in the outbound web traffic.

9. The method of claim 4, wherein the monitoring inbound electronic mail traffic includes analyzing a displayed message within the inbound electronic mail traffic for text indicating that the electronic mail is responsive to a user registration process.

10. The method of claim 4, wherein restricting access includes preventing submission of credentials for the user to the external resource.

11. The method of claim 4, wherein the monitoring inbound electronic mail traffic includes monitoring activity by a local electronic mail client executing on the endpoint.

12. The method of claim 4, wherein the monitoring inbound electronic mail traffic includes monitoring activity within a web mail client displayed within the web browser executing on the endpoint.

13. The method of claim 4, wherein restricting access includes notifying the user of an unsolicited electronic mail and requesting an explicit authorization from the user before permitting use of the hyperlink to access the external resource.

14. The method of claim 4, wherein monitoring outbound web traffic includes restricting the outbound web traffic according to a security policy for an enterprise network.

15. The method of claim 4, wherein the monitoring inbound electronic mail traffic includes restricting the inbound electronic mail traffic according to a security policy for an enterprise network.

16. The method of claim 4, wherein at least one of monitoring inbound electronic mail traffic and the monitoring outbound web traffic includes remotely monitoring network communications at a firewall coupled between the endpoint and a gateway for an enterprise network.

17. A device configured to prevent phishing attacks, the device comprising:
a memory; and a processor configured by computer executable code stored in the memory to perform:
monitoring outbound web traffic originating from a web browser executing on an endpoint, the endpoint associated with an enterprise network, and the endpoint further associated with a user of the enterprise network, monitoring inbound electronic mail traffic addressed to the user of the endpoint, in response to a hyperlink to an external resource detected in an electronic mail in the inbound electronic mail traffic addressed to the user, performing a search of the outbound web traffic originating from the web browser before receipt of the electronic mail for one or more possible sources of a request for the electronic mail by the user, and in response to the search failing to identify the one or more possible sources of the request for the electronic mail by the user in the outbound web traffic from the web browser, restricting access from the endpoint, via the hyperlink in the electronic mail, to the external resource.

18. The device of claim 17, wherein the processor is further configured to conditionally allow access to the external resource based on a security policy of the enterprise network.

19. The device of claim 17, wherein the device includes a threat management facility for the enterprise network.

20. The device of claim 17, wherein the device includes a firewall between the endpoint and a network.

* * * * *